(12) United States Patent
Okabe et al.

(10) Patent No.: US 9,816,582 B2
(45) Date of Patent: Nov. 14, 2017

(54) BALANCER DEVICE FOR INTERNAL COMBUSTION ENGINE

(71) Applicant: HITACHI AUTOMOTIVE SYSTEMS, LTD., Hitachinaka-shi, Ibaraki (JP)

(72) Inventors: Harunobu Okabe, Sagamihara (JP); Masatoshi Matsuo, Atsugi (JP); Tamotsu Todo, Atsugi (JP); Masaharu Saito, Atsugi (JP); Dai Niwata, Atsugi (JP); Hiroaki Kabasawa, Atsugi (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 57 days.

(21) Appl. No.: 14/884,249

(22) Filed: Oct. 15, 2015

(65) Prior Publication Data

US 2016/0131221 A1    May 12, 2016

(30) Foreign Application Priority Data

Nov. 11, 2014 (JP) .................................. 2014-228519

(51) Int. Cl.
*F16F 15/26* (2006.01)

(52) U.S. Cl.
CPC .................................. *F16F 15/267* (2013.01)

(58) Field of Classification Search
CPC ...... F16F 15/264; F16F 15/265; F16F 15/267; F16F 15/268; F16F 2230/06; F01M 2001/0276; F01M 2001/0269
See application file for complete search history.

(56) References Cited

U.S. PATENT DOCUMENTS

| 5,495,833 | A  | * | 3/1996  | Ishizaka  | F01M 1/02 123/179.25 |
| 6,536,400 | B1 | * | 3/2003  | Inumaru   | F01M 1/16 123/196 R |
| 7,669,574 | B2 | * | 3/2010  | Nagahashi | F01M 11/02 123/192.2 |
| 8,387,583 | B2 | * | 3/2013  | Kato      | F16F 15/267 123/192.2 |
| 2010/0154735 | A1 | * | 6/2010  | Kato    | F16F 15/267 123/192.2 |
| 2011/0283966 | A1 | * | 11/2011 | Zwickler | F16F 15/267 123/196 R |

FOREIGN PATENT DOCUMENTS

JP       5186424 B2    4/2013

* cited by examiner

*Primary Examiner* — Long T Tran
(74) *Attorney, Agent, or Firm* — Foley & Lardner LLP

(57) ABSTRACT

A balancer device includes a housing fixed to an internal combustion engine, a roller bearing disposed in the housing, a balancer shaft rotatably supported in the housing by the roller bearing, a balancer weight integrally mounted on the balancer shaft and rotatably accommodated in an weight accommodation room of the housing, an introduction part that introduces a lubricating oil from the outside to the inside of the weight accommodation room, and a discharge part that provides communication between the inside and the outside of the weight accommodation room and discharges the lubricating oil from the inside of the weight accommodation room, wherein herein the roller bearing is arranged to face the weight accommodation room.

18 Claims, 31 Drawing Sheets

BALANCER DEVICE FOR INTERNAL COMBUSTION ENGINE

BACKGROUND OF THE INVENTION

The present invention relates to a balancer device for reducing secondary vibration caused by rotation of an internal combustion engine.

Hereinafter, the terms "upper", "lower", "above", "below" and the like are used with respect to the direction of gravity; and the terms "front" and "rear" are used with respect to the orientation of a vehicle to which an internal combustion engine with a balancer device is mounted.

Japanese Patent No. 5186424 discloses a balancer device for reducing secondary vibration in an internal combustion engine, which includes a housing fixed to the internal combustion engine, a roller bearing disposed in the housing, a balancer shaft rotatably supported in the housing by the roller bearing, a balancer weight integrally mounted on the balancer shaft and rotatably accommodated in an weight accommodation space of the housing and a gear fitted around the balancer shaft and rotatably accommodated in a gear accommodation space of the housing. In this balancer device, an oil introduction hole is formed in an upper side of the gear accommodation space for introduction of oil from the internal combustion engine into the gear accommodation space. Further, the gear accommodation space is arranged such that a lateral side of the gear accommodation space faces an axial end portion of the roller bearing. When the gear is rotated with rotation of the balancer shaft, the oil in the gear accommodation space is agitated by external teeth of the gear so as to create an atmosphere of oil mist or splash in the gear accommodation space. The roller bearing is lubricated by such oil mist or splash from the gear accommodation space.

SUMMARY OF THE INVENTION

In the above conventional balancer device, however, there is a case that the oil gets splashed by the external gear teeth and discharged out of the gear accommodation space through the oil introduction hole and thereby becomes insufficient in the gear accommodation space. There is also a case that the oil becomes excessive in the gear accommodation space due to the presence of no oil discharge hole. These cases lead to unsatisfactory oil lubrication of the roller bearing.

The present invention has been made in view of the foregoing technical problem. It is an object of the present invention to provide a balancer device for an internal combustion engine, which enables improved lubrication of roller bearing(s).

According to one aspect of the present invention, there is provided a balancer device for an internal combustion engine, comprising: a housing fixed to the internal combustion engine and defining therein a weight accommodation room; at least one roller bearing disposed in the housing; a balancer shaft rotatably supported in the housing by the at least one roller bearing; a balancer weight integrally mounted on the balancer shaft and rotatably accommodated in the weight accommodation room; an introduction part that introduces a lubricating oil from the outside of the housing to the inside of the weight accommodation room; and a discharge part that provides communication between the inside and the outside of the weight accommodation room and discharges the lubricating oil from the inside of the weight accommodation room, wherein the at least one roller bearing is arranged to face the weight accommodation room.

According to another aspect of the present invention, there is provided a balancer device for an internal combustion engine, comprising: a housing fixed to the internal combustion engine and defining therein a weight accommodation room; a roller bearing disposed in the housing; a balancer shaft rotatably supported in the housing by the roller bearing; a balancer weight integrally mounted on the balancer shaft and rotatably accommodated in the weight accommodation room; an introduction part that allows free flow of a lubricating oil from the outside of the housing and introduces the lubricating oil to the roller bearing; and a discharge part that provides communication between the inside and the outside of the weight accommodation room and discharges the lubricating oil from the inside of the weight accommodation room.

According to still another aspect of the present invention, there is provided a balancer device for an internal combustion engine, comprising: a housing fixed to the internal combustion engine and defining therein a weight accommodation room; needle bearings disposed in the housing; drive—and driven-side balancer shafts rotatably supported in the housing by the needle bearings such that the drive—side balancer shaft is rotated by rotation of a crankshaft of the internal combustion engine and such that the driven-side balancer shaft is rotated by rotation of the drive-side balancer shaft; balancer weights integrally mounted on the drive—and driven-side balancer shafts and rotatably accommodated in the weight accommodation room with one or both end sides of the respective balancer weights being supported by the needle bearings; an introduction part that introduces a lubricating oil to the weight accommodation room from the outside of the housing; and a discharge part that provides communication between the inside and the outside of the weight accommodation room and discharges the lubricating oil from the inside of the weight accommodation room, wherein the needle bearings are arranged to face the weight accommodation room.

It is possible in the present invention to achieve improved lubrication of the roller bearing(s) in the balancer device.

The other objects and features of the present invention will also become understood from the following description.

DESCRIPTIONS OF THE EMBODIMENTS

Figure 1:
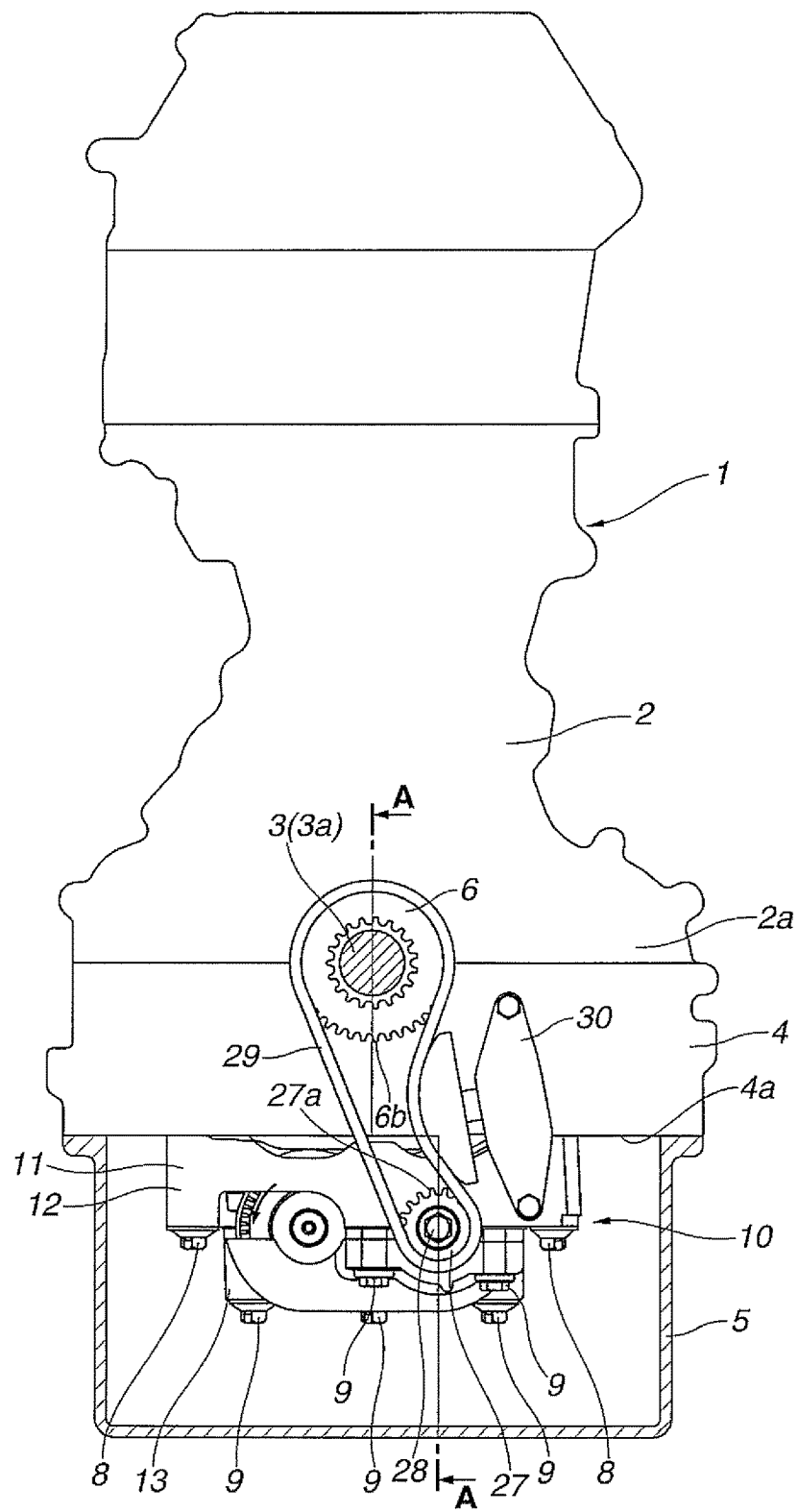
FIG. 1 is a plan view of an internal combustion engine to which a balancer device according to a first embodiment of the present invention is mounted.

The present invention will be described in detail below with reference to the drawings, in which like parts and portions are designated by like reference numerals.

The following exemplary embodiments each refers to a balancer device 10 for reducing secondary vibration caused by rotation of an internal combustion engine 1 in a vehicle.

[First Embodiment]

Figure 2:
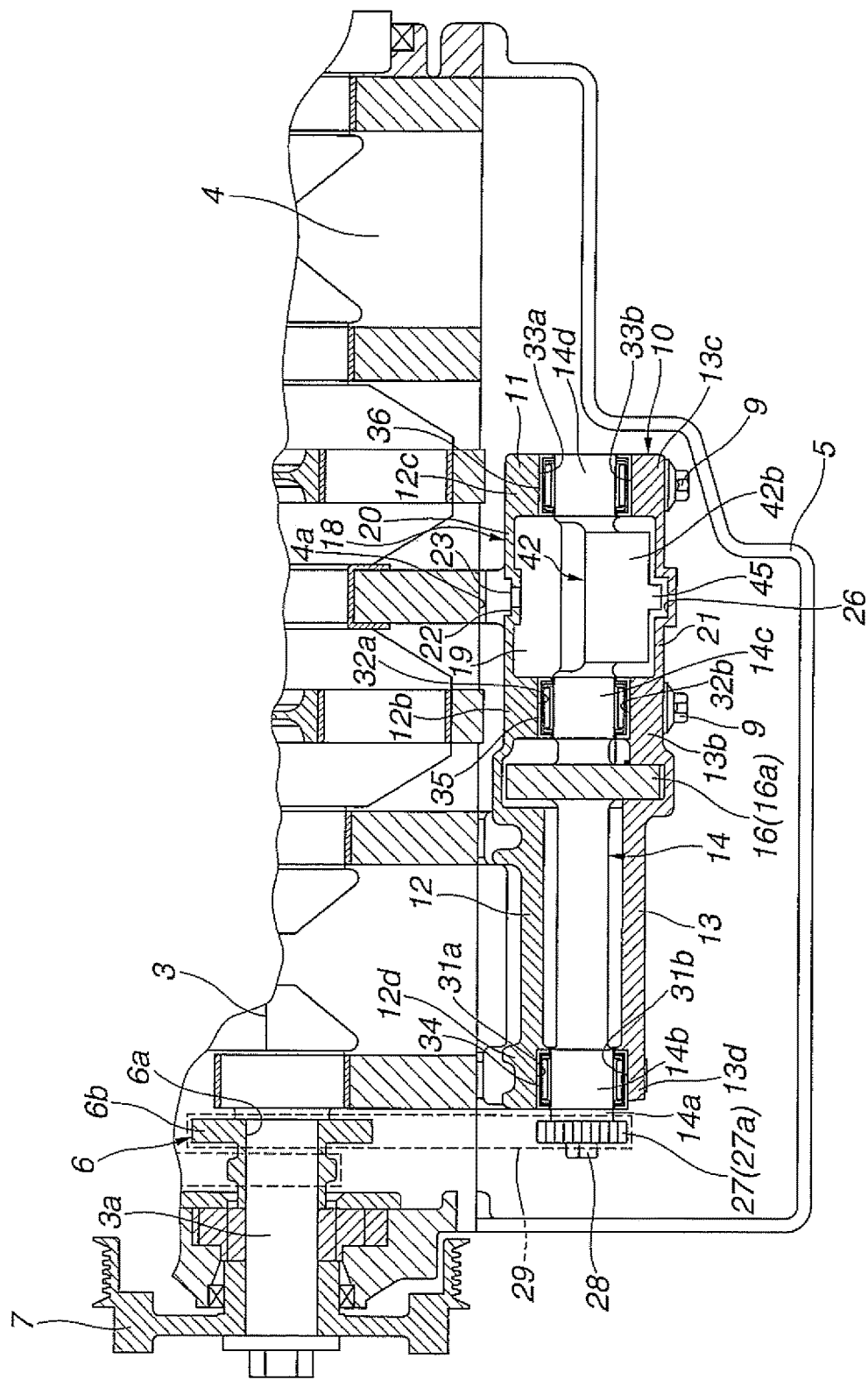
FIG. 2 is a section view the balancer device according to the first embodiment of the present invention as taken along line A-A of FIG. 1.

As shown in FIGS. 1 and 2, the balancer device 10 is mounted to a cylinder block 2 of the internal combustion engine 1.

In the internal combustion engine 1, a ladder frame 4 is fixed to a lower part 2a of the cylinder block 2 by bolts. A crankshaft 3 is rotatably supported between the ladder frame 4 and the lower part 2a of the cylinder block 2 (more specifically, a shaft bearing groove of the lower part 2a of the cylinder block 2 and a shaft bearing portion of the latter frame 4). An oil pan 5 is attached to an outer periphery of a lower surface 4a of the ladder frame 4 so as to store therein a lubricating oil O. A large-diameter crank sprocket 6 is formed with a center insertion hole 6a and a plurality of external gear teeth 6b and is fixed to a front end portion 3a (also referred to as "support shaft portion") of the crankshaft 3 by insertion of the support shaft portion 3a in the insertion hole 6a. A drive pulley 7 is attached to the crankshaft 3 at a position front of the crank sprocket 6 so as to transmit rotation of the crankshaft 3 to external equipment through a timing belt.

As shown in FIGS. 1 and 2, the balancer device 10 is arranged in a space surrounded by the lower surface 4a of the ladder frame 4 and the oil pan 5. The balancer device 10 includes a housing 11 fixed to the lower surface 4a of the ladder frame 4 by six fixing bolts 8, a pair of drive and driven shafts 14 (as drive—and driven-side balancer shafts) rotatably supported in the housing 11 in parallel with each other along the front-rear direction of the internal combustion engine 1 and drive—and driven-side thin cylindrical gears 16 and 17 press-fitted around the drive and driven shafts 14 and 15, respectively, as shown in FIGS. 1 to 8. In the first embodiment, the drive—and driven-side gears 16 and 17 are of the helical type having a plurality of external gear teeth 16a and 17a engaged with each other.

Figure 3:
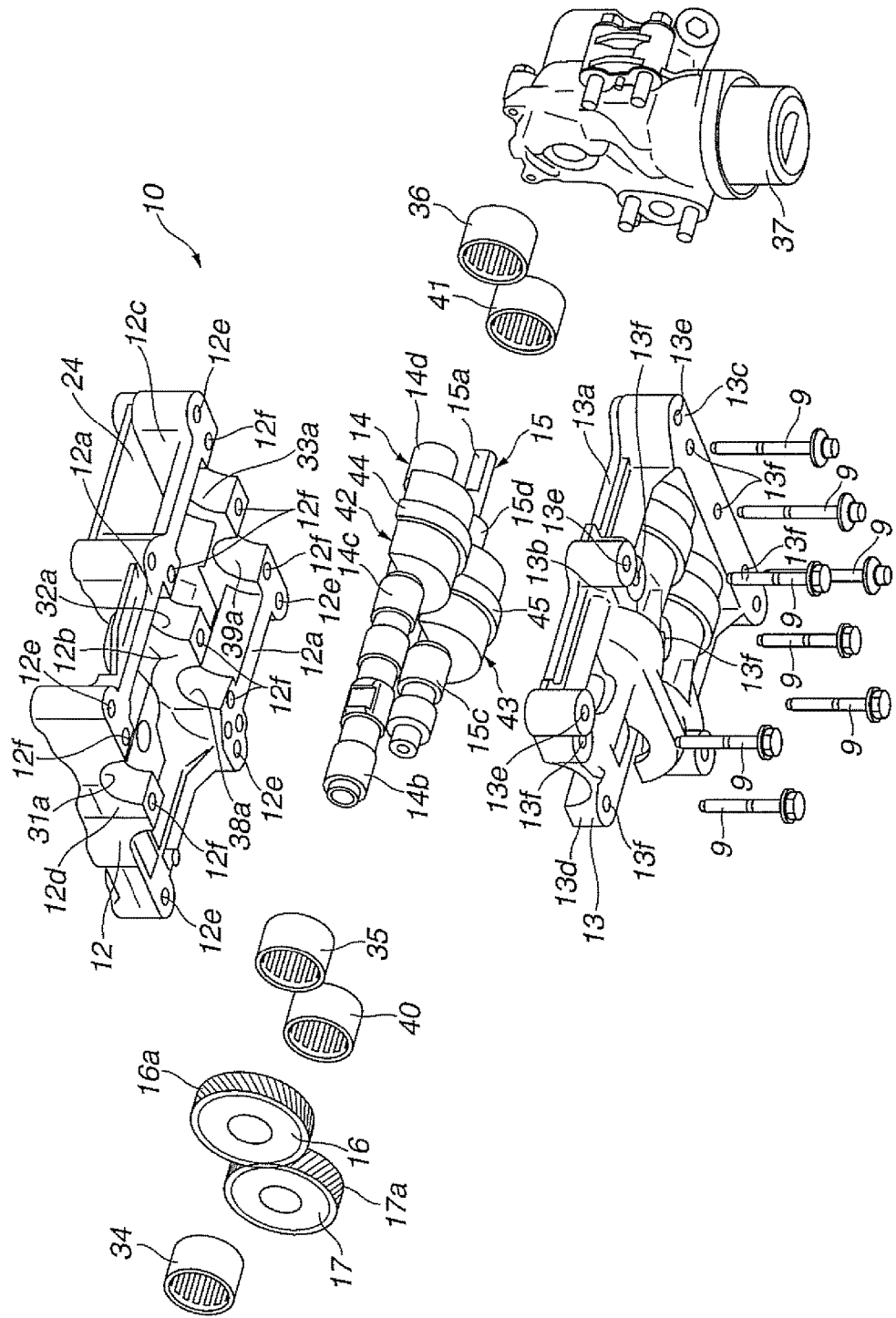
FIG. 3 is an exploded perspective view of the balancer device according to the first embodiment of the present invention.
Figure 4:
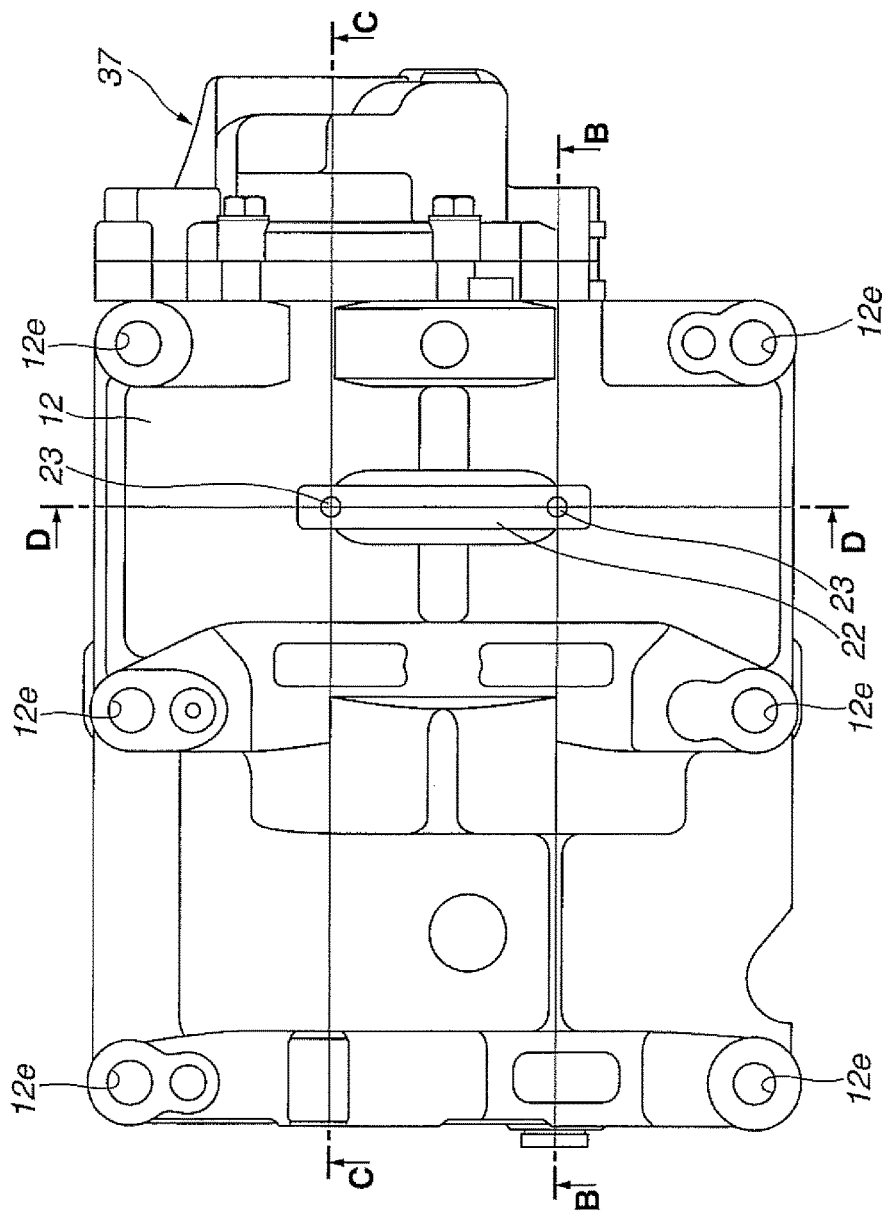
FIG. 4 is a plan view of the balancer device according to the first embodiment of the present invention.

The housing 11 has a half-split structure of upper and lower housing members 12 and 13 made by aluminum die casting and vertically fastened together by eight fastening bolts 9. As shown in FIG. 3, each of the upper and lower housing members 12 and 13 has a generally rectangular shape with a narrow width area and a wide width area when viewed in plan.

Frame deck portions 12a and 13a are formed with a predetermined width on respective peripheral mating parts of the upper and lower housing members 12 and 13.

Six bolt insertion holes 12e, 13e are made at given outer peripheral positions in each of the frame deck portions 12a and 13a for insertion of the fixing bolts 8.

First and second cross deck portions 12b and 12c are integrally formed on front and rear sides of the wide width area of the upper housing member 12 so as to extend in parallel with each other across the frame deck portion 12a in the width direction of the internal combustion engine 1. First and second cross deck portions 13b and 13c are integrally formed on front and rear sides of the wide width area of the lower housing member 13 so as to extend in parallel with each other across the frame deck portion 13a in the width direction of the internal combustion engine 1.

Third cross deck portions 12d and 13d are formed with a shorter length on front sides of the narrow width areas of the upper and lower housing members 12 and 13 so as to extend in parallel with the first and second cross deck portions 12b, 13b and 12c, 13c and combine with the frame deck portions 12a and 13a, respectively.

Eight bolt insertion holes 12f, 13f are made in each of the first to third cross deck portions 12b, 13b, 12c, 13c, 12d and 13d for insertion of the fastening bolts 9.

As shown in FIGS. 2 and 5 to 8, a circumferential wall 18 is formed between the first and second cross deck portions 12b, 13b and 12c, 13c of the upper and lower housing members 12 and 13. Herein, the circumferential wall 18 includes an upper circumferential wall 20 between the first and second cross deck portions 12b and 12c of the upper housing member 12 and a lower circumferential wall 21 between the first and second cross deck portions 13b and 13c of the lower housing member 13.

There is a weight accommodation room 19 defined by the first and second cross deck portions 12b, 13b, 12c, 13c (front and rear side walls) and the circumferential wall 18 (upper and lower circumferential walls 20 and 21) such that the after-mentioned drive—and driven-side counter weights 42 and 43 are rotatably accommodated in the weight accommodation room 19. In other words, the weight accommodation room 19 is defined as a substantially cocoon-like internal space where two cylindrical spaces are adjacent to each other along the front-rear direction of the internal combustion engine 1.

As shown in FIGS. 4 to 7, a recessed portion 22 is formed in an outer circumferential surface of an upper end region of the upper circumferential wall 20 so as to collect therein the oil O from the internal combustion engine 1. In the first embodiment, the recessed portion 22 is arranged at a substantially middle position of the upper circumferential wall 20 (circumferential wall 18) in the axial direction of the shaft 14, 15 and extends in an elongated groove shape from above the drive shaft 14 to above the driven shaft 15.

Oil introduction holes 23 (as an introduction part) are formed in the recessed portion 22 at positions above the drive and driven shafts 14 and 15 so as to provide communication between the inside and outside of the weight accommodation room 19 and thereby introduce therethrough the oil O from the recessed portion 22 into the weight accommodation room 19.

Figure 7:
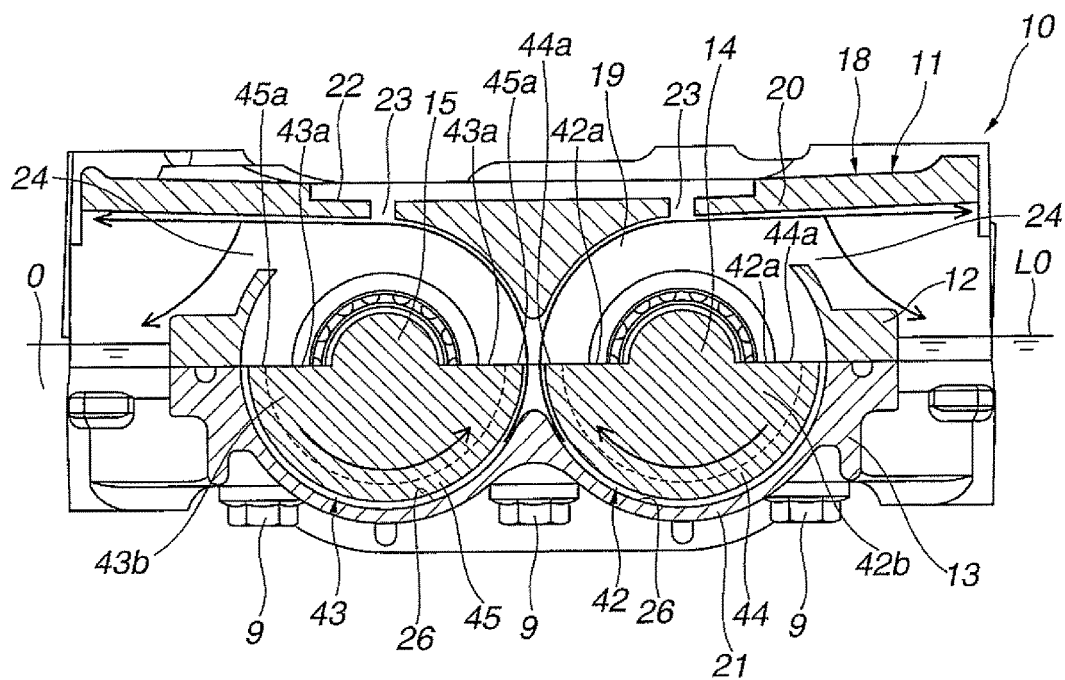
FIG. 7 is a section view the balancer device according to the first embodiment of the present invention as taken along line D-D of FIG. 4.

On the other hand, oil discharge holes 24 (as a discharge part) are formed in both lateral end regions of the upper circumferential wall 20 in the radial direction of the shaft 14, 15 so as to provide communication between the inside and outside of the weight accommodation room 19 and thereby discharge therethrough the oil O from the weight accommodation room 19 to the oil pan 5. In the first embodiment, the oil discharge holes 24 extend almost throughout the upper circumferential wall 20 in the axial direction of the shaft 14, 15 as shown in FIGS. 3 and 7. Each of these oil discharge holes 24 is arranged at a higher position than the surface L0 of the oil O in the oil pan 5 during stop of the internal combustion engine 1 as shown in FIG. 7.

Figure 5:
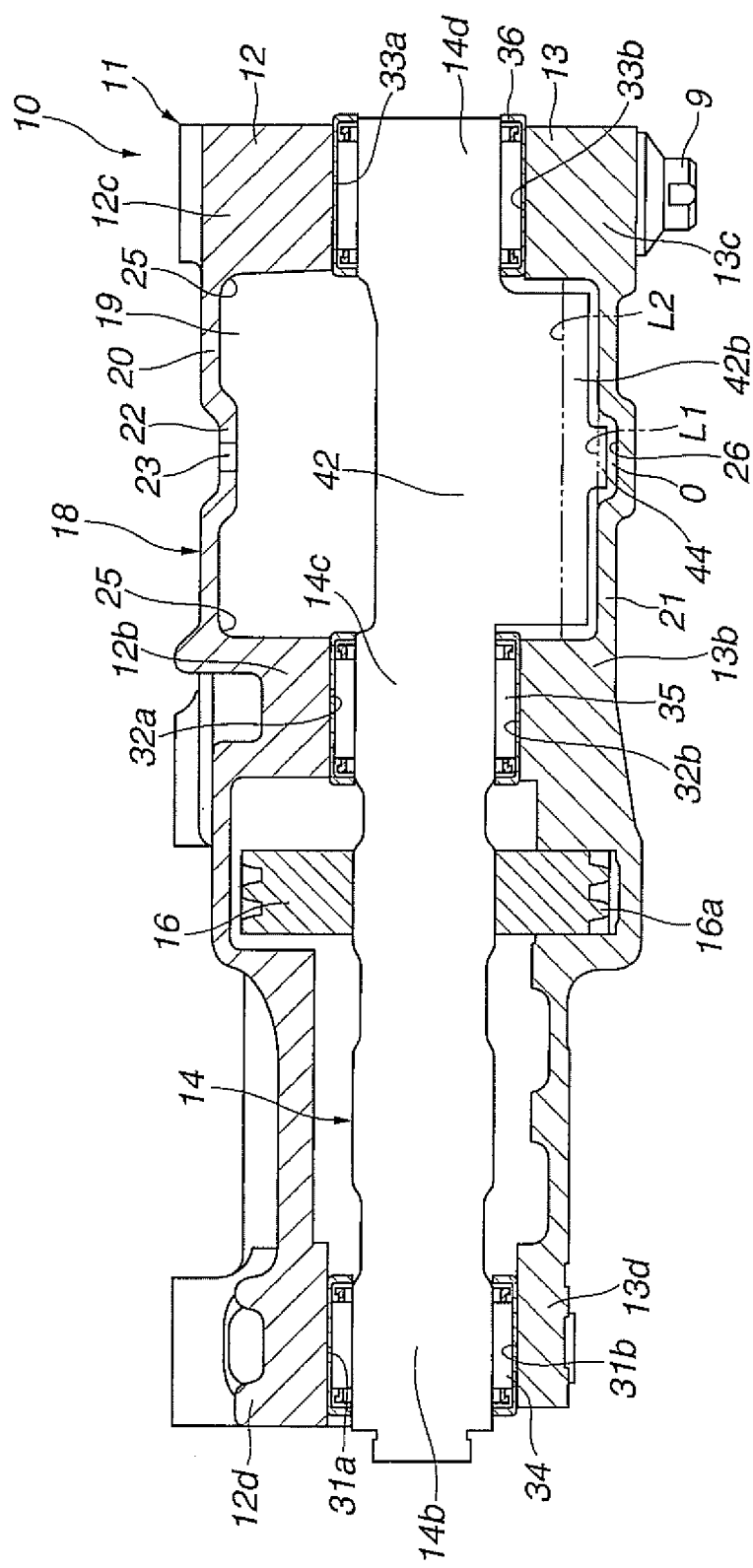
FIG. 5 is a section view the balancer device according to the first embodiment of the present invention as taken along line B-B of FIG. 4.
Figure 6:
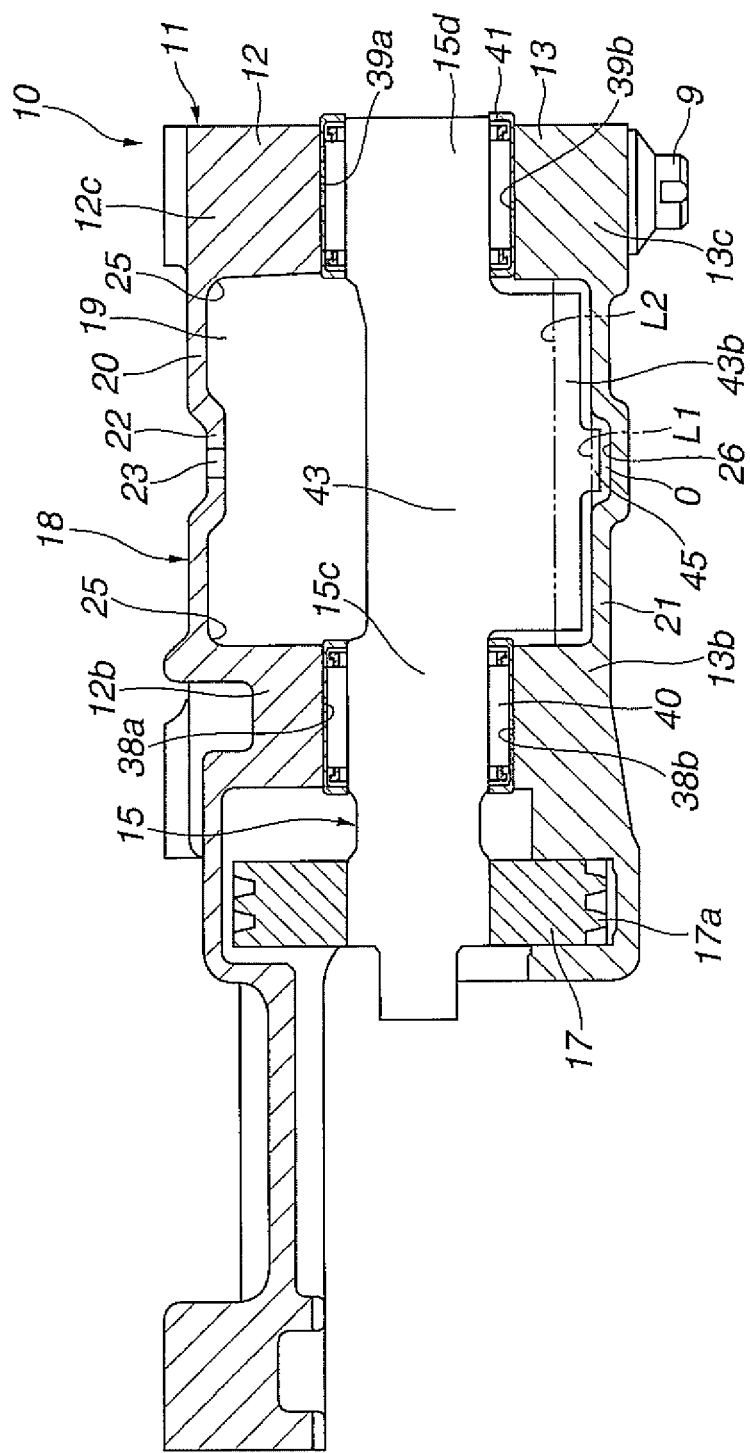
FIG. 6 is a section view the balancer device according to the first embodiment of the present invention as taken along line C-C of FIG. 4.

There are also chamfered surfaces 25 formed on boundaries between an inner circumferential surface of the upper circumferential wall 20 and wall surfaces of the first and second cross deck portions 12b and 12c such that, when viewed in cross section, the chamfered surfaces 25 have a substantially circular arc shape inclined gradually downwardly as shown in FIGS. 5 and 6.

Further, an oil collection groove 26 is formed in an inner circumferential surface of the lower circumferential wall 21 so as to collect therein the oil O introduced through the oil introduction holes 23 as shown in FIGS. 5 to 7. In the first embodiment, the oil collection groove 26 is arranged at a substantially middle position of the lower circumferential wall 21 (circumferential wall 18) in the axial direction of the shaft 14, 15 and extends in a concave shape with a constant depth almost throughout the lower circumferential wall 21 in the width direction of the internal combustion engine 1.

The oil introduction hole 23 and the oil collection groove 26 are thus arranged at substantially the same position of the weight accommodation room 19 in the axial direction of the shaft 14, 15 as shown in FIGS. 5 and 6.

As shown in FIGS. 1 and 2, a front end 14a of the drive shaft 14 protrudes from the housing 11. A balancer sprocket 27 is formed with a plurality of external gear teeth 27a and is fixed to the front end 14a of the drive shaft 14 by a bolt 28. A tensioner 30 is attached to a front end surface of the balancer device 10. A drive chain 29 is wounded around the gear teeth 6a of the crank sprocket 6 and the gear teeth 27a of the balancer sprocket 27 with the application of a tension to the drive chain 29 by the ladder frame 4 and the tensioner 30.

When the rotation of the crankshaft 3 is transmitted to the drive shaft 14 through the drive chain 29, the drive shaft 14 and the driven shaft 15 are rotated in opposite directions to each other by helical engagement of the drive—and driven-side gears 16 and 17. In the first embodiment, the drive and driven shafts 14 and 15 are each rotated two turns per one turn of the crankshaft 3. It is herein assumed that, in the following explanation, the drive shaft 14 and the driven shaft 15 rotate in a clockwise direction and a counterclockwise direction of FIG. 1, respectively, unless otherwise noted.

As shown in FIGS. 3 and 5, first bearing grooves 31a, 31b, second bearing grooves 32a, 32b and third bearing grooves 33a, 33b are made in the upper and lower housing members 12 and 13 at positions facing the first cross deck portions 12b, 13b, the second cross deck portions 12c, 13c and the third cross deck portions 12d, 13d. First, second and third cylindrical journal portions 14b, 14c and 14d are formed on front end, middle and rear end parts of the drive shaft 14 and rotatably supported by needle bearings 34, 35 and 36 (as roller bearings) in the first bearing grooves 31a, 31b, second bearing grooves 32a, 32b and third bearing grooves 33a, 33b, respectively.

By contrast, a rear end of the driven shaft 15 protrudes from the housing 11 as shown in FIG. 3. An oil pump 37 is connected to the rear end of the driven shaft 15 through a width across flat part 15a so as to suck up the oil O from the oil pan 5 by the action of rotational force of the driven shaft 15 and supply the oil O to respective sliding parts and drive parts of the internal combustion engine 1.

As shown in FIGS. 3 and 6, fourth bearing grooves 38a, 38b and fifth bearing grooves 39a, 39b are made in the upper and lower housing members 12 and 13 at positions facing the second cross deck portions 12c, 13c and the third cross deck portions 12d, 13d. Fourth and fifth cylindrical journal portions 15c and 15d are formed on front end and middle parts of the driven shaft 15 and rotatably supported by needle bearings 40 and 41 (as roller bearings) in the fourth bearing grooves 38a, 38b and the fifth bearing grooves 39a, 39b, respectively.

The needle bearings 35 and 40 on the first cross deck portions 12b and 13b are arranged such that rear axial ends of the needle bearings 35 and 40 face the weight accommodation room 19; whereas the needle bearings 36 and 41 on the second cross deck portions 12c and 13c are arranged such that front axial ends of the needle bearings 36 and 41 face the weight accommodation room 19.

As shown in FIGS. 2 to 3 and 5 to 8, the drive-side counter weight 42 (as a balancer weight) is integrally mounted on the part of the drive shaft 14 corresponding in position to the weight accommodation room 19 (i.e., the part of the drive shaft 14 between the second and third journal portions 14c and 14d); and the driven-side counter weight 43 (as a balancer weight) is integrally mounted on the part of the driven shaft 15 corresponding in position to the weight accommodation room 19 (i.e. the part of the driven shaft 15 between the fourth and fifth journal portions 15c and 15d).

As the basic structures of the drive—and driven-side counter weights 42 and 43 are the same, the drive-side counter weight 42 will be mainly explained below.

Figure 8:
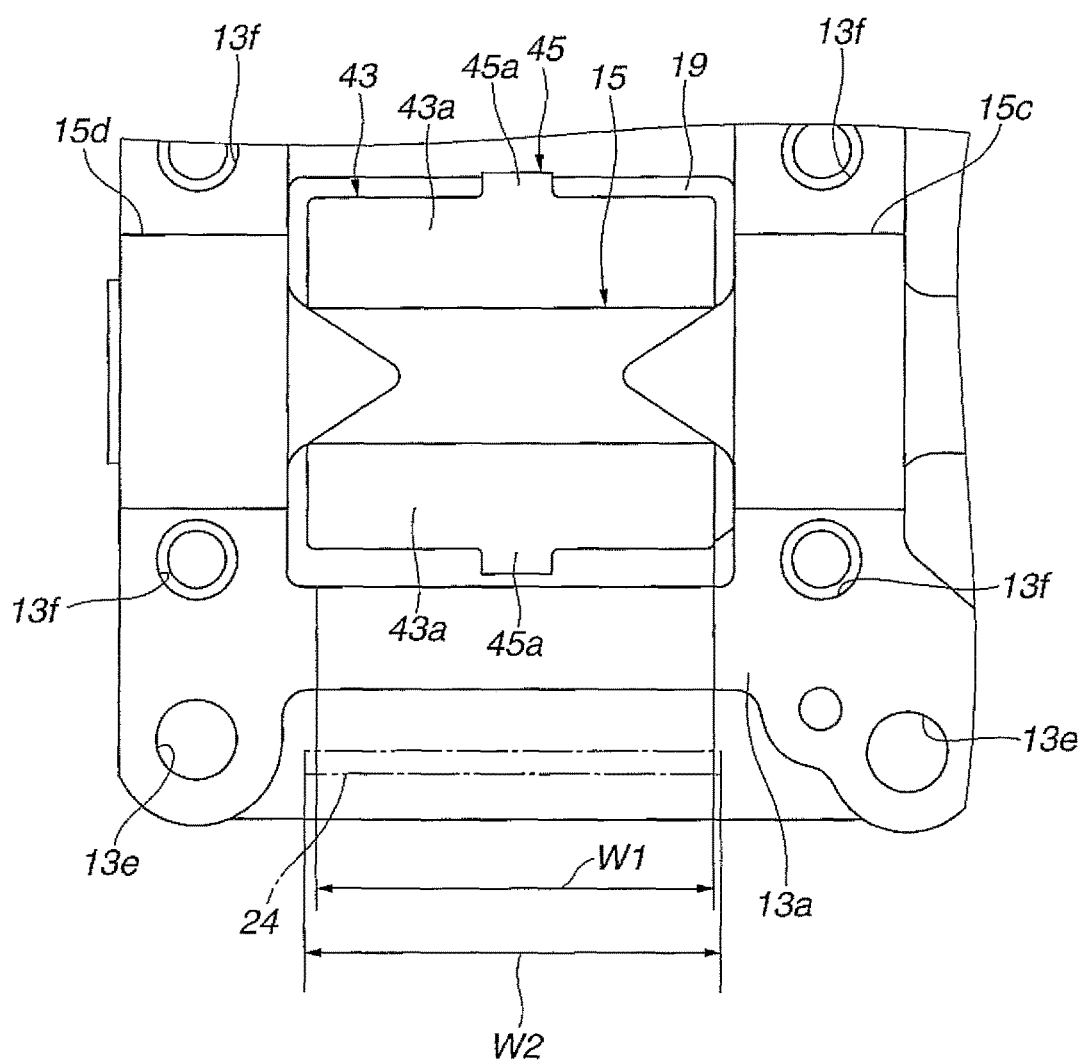
FIG. 8 is a plan view showing the positional and dimensional relationship of a balancer weight and an oil discharge hole in the balancer device according to the first embodiment of the present invention.

The drive-side counter weight 42 is semi-cylindrical in shape about the axial center of the drive shaft 14. As shown in FIGS. 3, 5 and 7, the drive-side counter weight 42 includes, on an outer circumferential surface thereof, a pair of two flat surface portions 42a located on both sides of the axial center of the drive shaft 14 and a weight portion 42b having a semi-circular arc cross sectional profile and protruding from the flat surface portions 42a toward one radial direction of the shaft 14. In the first embodiment, the drive-side counter weight 42 extends substantially equally toward the front and rear in the axial direction with respect to a substantially axially middle position of the weight accommodation room 19. As shown in FIG. 8, the width W1 of the drive-side counter weight 42 in the axial direction of the drive shaft 14 is set smaller than the width W2 of the oil discharge hole 24 of the weight accommodation room 19 in the axial direction of the drive shaft 14.

A protrusion 44 of semi-circular arc cross section is integrally formed at a substantially axially middle position of the outer circumferential surface of the weight portion 42b (i.e. at a position corresponding to the oil collection groove 26 of the weight accommodation room 19) so as to protrude along the concave shape of the oil collection groove 26. In the first embodiment, the protrusion 44 is adjusted to a predetermined size such that an outer circumferential part of the protrusion 44 is placed in the oil collection groove 26 without being in contact with an inner circumferential surface of the oil collection groove 36. In other words, the axial width of the protrusion 44 is set smaller than the groove width of the oil collection groove 26; and the outer diameter of the protrusion 44 is set slightly smaller than the distance from the axial center of the drive shaft 14 to the bottom of the oil collection groove 26. Further, the protrusion 44 extends almost throughout the circumferential direction of the weight portion 42b with circumferentially opposite end surfaces 44a of the protrusion 44 being in flush with the flat surface portions 42a of the drive-side counter weight 42 as shown in FIGS. 7 and 8.

Similarly, the driven-side counter weight 43 includes, on an outer circumferential surface thereof, a pair of two flat surface portions 43a located on both sides of the axial center of the driven shaft 15 and a weight portion 43b having a semi-circular arc cross sectional profile and protruding from the flat surface portions 43a toward one radial direction of the shaft 15.

A protrusion 45 of semi-circular arc cross section is integrally formed at a substantially axially middle position of the outer circumferential surface of the weight portion 43b with circumferentially opposite end surfaces 45a of the protrusion 45 being in flush with the flat surface portions 43a of the driven-side counter weight 43.

The above-structured balancer device 10 operates as follows. When the crankshaft 3 is driven and rotated upon start of the internal combustion engine 1, the rotation of the crankshaft 3 is transmitted to the drive shaft 4 through the crank sprocket 6, the drive chain 29 and the balancer sprocket 27. Then, the drive shaft 14 is rotated at a speed twice as fast as the rotation speed of the crankshaft 3. As the rotation of the drive shaft 14 is transmitted to the driven shaft 15 through helical engagement of the drive13 and driven-side gears 16 and 17, the driven shaft 15 is rotated at the same speed in the opposite direction to the driven shaft 14. As a result, the drive13 and driven-side counter weights 42 and 43 are rotated in opposite directions to each other so as to cancel lateral centrifugal forces of the drive and driven shafts 14 and 15 and generate vertical vibratory forces. The occurrence of secondary vibration in the internal combustion engine 1 can be suppressed by the action of such vibratory forces.

At this time, it is necessary to supply the oil O to the respective needle bearings 34, 35, 36, 40 and 41 for smooth rotation of the drive and driven shafts 14 and 15.

As the supply method of the oil O, there is generally known a so-called forcible lubrication technique to establish a lubricating oil supply passage from the oil pump 37 to the needle bearing 34, 35, 36, 40, 41 and pressure-feed the oil O by the oil pump 37 to the needle bearing 34, 35, 36, 40, 41 through the lubricating oil supply passage. In this forcible lubrication technique, however, the oil O may be supplied excessively to cause an increase in friction between the shaft 14, 15 and the needle bearing 34, 35, 36, 40, 41 by agitation of the oil O between needles of the needle bearing 34, 35, 36, 40, 41 and thereby interfere with the smooth rotation of the shaft 14, 15.

Therefore, a so-called oil mist lubrication technique is adopted for lubrication of the needle bearings 35, 36, 40 and 41, which are arranged facing the weight accommodation room 19, in the first embodiment. In this oil mist lubrication technique, the oil O in the weight accommodation room 19 is agitated by the drive—and driven-side counter weights 42 and 43 and fed in mist or splash form to the needle bearings 35, 36, 40 and 41.

The operations and effects of the first embodiment will be hereinafter described with respect to the driven side of the balancer device 10 as the operations and effects of the first embodiment are the same to both of the drive and driven sides of the balancer device 10.

Although most of the oil O from the internal combustion engine 1 is dropped and stored in the oil pan 5, some of the oil O from the internal combustion engine 1 is dropped into the recessed portion 22 of the upper housing member 12 of the balancer device 10, introduced into the weight accommodation room 19 through the oil introduction hole 23 under its own weight and then collected in the oil collection groove 26 of the weight accommodation room 19. When the driven-side counter weight 43 is rotated in a state that the oil O is collected in the oil collection grove 26, the oil surface L1 of the oil O is agitated by the end surfaces 45a of the protrusion 45 of the driven-side counter weight 43 (see FIG. 6) and spread in mist form or splash form. There is thus created an atmosphere where the mist or splash of the oil O diffuses in the weight accommodation room 19 so that the needle bearings 40 and 41 are lubricated by the mist or splash of the oil O from the weight accommodation room 19.

By the above oil mist lubrication technique, the excessive supply of the oil O to the needle bearing 40, 41 can be prevented to decrease the resistance of the oil O caused by agitation between the needles of the needle bearing 40, 41 and reduce the friction between the shaft 15 and the needle bearing 40, 41. It is accordingly possible to achieve improved lubrication of the needle bearing 40, 41 and ensure the reliability of lubrication of the needle bearing 40, 41.

Differently from the forcible lubrication technique, the oil mist lubrication technique enables lubrication of the needle bearings 40, 41 without the use of the oil pump 37. It is thus possible to reduce the amount of the oil O supplied to the balancer device 10 and reduce the power consumption of the oil pump 37 for improvement of fuel efficiency.

In the first embodiment, the driven-side counter weight 43 is adapted to perform not only the function of agitating the oil O as mentioned above, but also the function of discharging the excessive oil O from the weight accommodation room 19 to the oil pan 5 to optimize the amount of the oil O in the weight accommodation room 19 as follows.

In the case where the oil O is present in a large amount in the weight accommodation room 19 (e.g. the surface of the oil O in the weight accommodation room 19 is at a high level L2 in FIG. 7), the oil O is agitated upward by a relatively wide surface area of the driven-side counter weight 43 (including the flat surface portions 43a and the end surfaces 45a of the protrusion 45) and discharged from the weight accommodation room 19 to the oil pan 5 through the oil discharge hole 24 under the action of rotational force of the driven-side counter weight 43 as shown by arrows in FIG. 7. As the axial width W2 of the oil discharge hole 24 is set larger than the axial width W1 of the driven-side counter weight 43, the oil O can be smoothly discharged from the weight accommodation room 19 to the oil pan 5 through the oil discharge hole 24. It is thus possible to promptly decrease the amount of the oil O in the weight accommodation room 19 and reduce the friction between the driven-side counter weight 43 and the oil O.

In the case where the oil O is present in a small amount in the weight accommodation room 19 (e.g. the surface of the oil O in the weight accommodation room 19 is at a low level L1 in FIG. 7), by contrast, the oil O is agitated and discharged by mainly the end surfaces 45a of the protrusion 45. As the amount of the oil O discharged through the oil discharge hole 24 decreases with decrease in the amount of the oil O agitated upward by the driven-side counter weight 43, only the excessive oil O can be discharged from the weight accommodation room 19 to the oil pan 5 through the oil discharge hole 24. It is thus possible to reduce the friction between the driven-side counter weight 43 and the oil O by limiting the area of contact between the driven-side counter weight 43 and the oil O to mainly the end surfaces 45a of the protrusion 45.

It is less likely that the oil O will be discharged excessively and become insufficient for the oil mist lubrication. There can be created the atmosphere where the oil O diffuses in mist form or splash form in the weight accommodation room 19 all the time for reliable lubrication of the needle bearing 40, 41.

In the case where a large amount of the oil O is constantly introduced to the weight accommodation room 19, the oil O is agitated and discharged by the flat surface portions 43a of the driven-side counter weight 43.

In the first embodiment, the oil collection groove 26 and the protrusion 45 are arranged at the substantially middle position of the weight accommodation room 19 in the axial direction of the shaft 14, 15 so that the oil O can be spread in mist or splash form from the center to both sides of the weight accommodation room 19. It is thus possible to, even though the mist or splash of the oil O is generated at only one point in the weight accommodation room 19, uniformly lubricate both of the needle bearings 40 and 41 by the mist or splash of the oil O. It is also possible to simplify the structure of the balancer device 10 for good productivity and cost reduction.

In addition, the oil collection groove 26 and the oil introduction hole 23 are also arranged at substantially the same position in the axial direction of the shaft 14, 15 so that most of the oil O introduced through the oil introduction hole 23 naturally flows to the oil collection groove 26 under its own weight and can be collected in the oil collection groove 26 in the first embodiment. It is thus possible to more efficiently generate the mist or splash of the oil O.

Furthermore, the oil introduction hole 23 is formed in the recessed portion 22 of the upper (outer) surface of the upper housing member 12 in the first embodiment. It is thus possible to improve the efficiency of introduction of the oil O into the weight installation room 19 and achieve more reliable lubrication of the needle bearing 40, 41 by the mist or splash of the oil O.

Although the balancer device 10 is located inside the oil pan 5 in view of layout design, the oil discharge hole 24 is arranged at a higher position than the surface L0 of the oil O in the oil pan 5 during stop of the internal combustion engine 1 in the first embodiment. By this arrangement, the oil O can be prevented from flowing backward from the oil pan 5 into the weight accommodation hole 19 through the oil discharge hole 24. It is thus possible to restrict an increase in the amount of the oil O in the weight accommodation room 19 and prevent the occurrence of excessive friction between the oil O and the driven-side counter weight 43.

[Second Embodiment]

Figure 9:
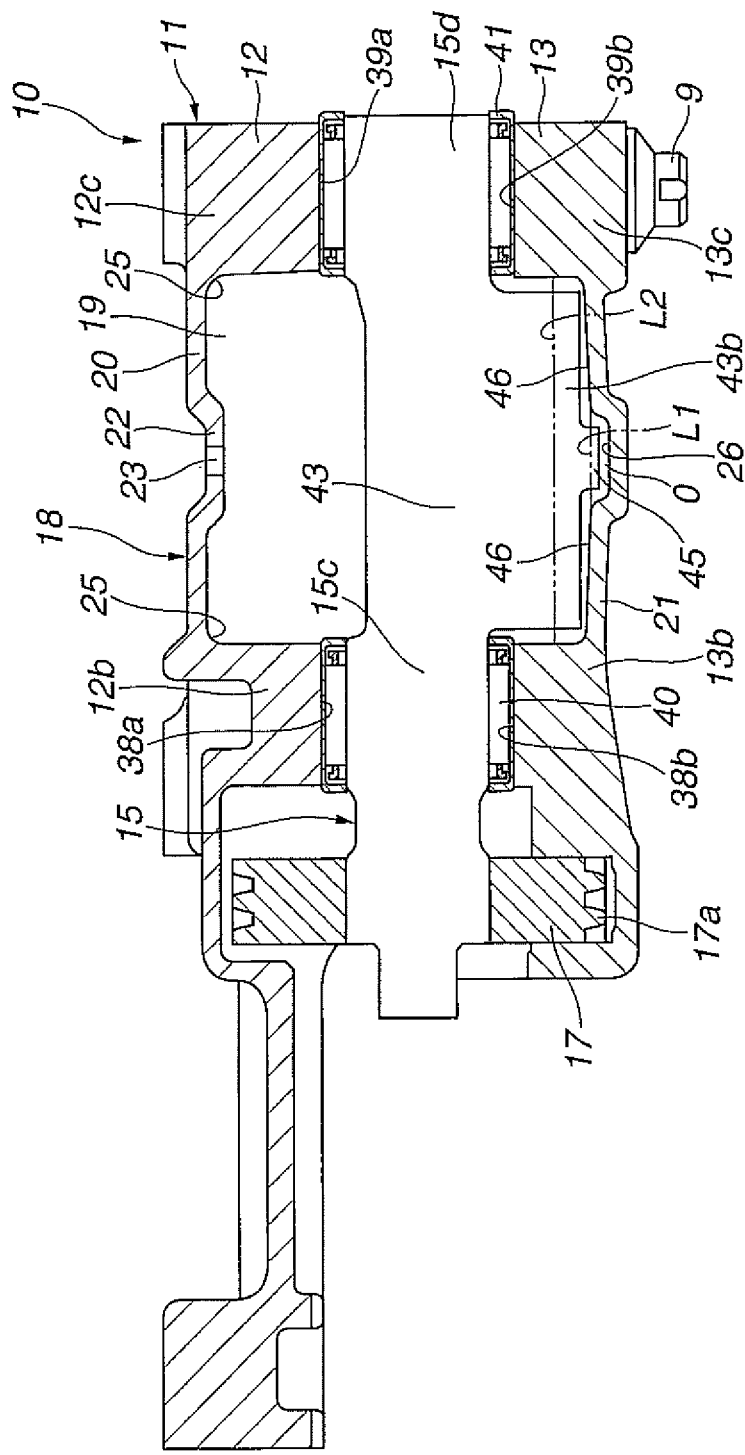
FIG. 9 is a section view corresponding to FIG. 6 but showing a balancer device according to a second embodiment of the present invention.

The second embodiment is basically the same as but different from the first embodiment in that: the inner circumferential surface of the lower circumferential wall 21 includes tapered bottom surface areas 46 inclined gradually downwardly toward the oil collection groove 26 as shown in FIG. 9. As the oil O can be guided to the oil collection groove 26 by these bottom surface areas 46, it is possible to allow more efficient diffusion of the oil O in mist or splash form for reliable lubrication of the needle bearing 40, 41.

[Third Embodiment]

Figure 10:
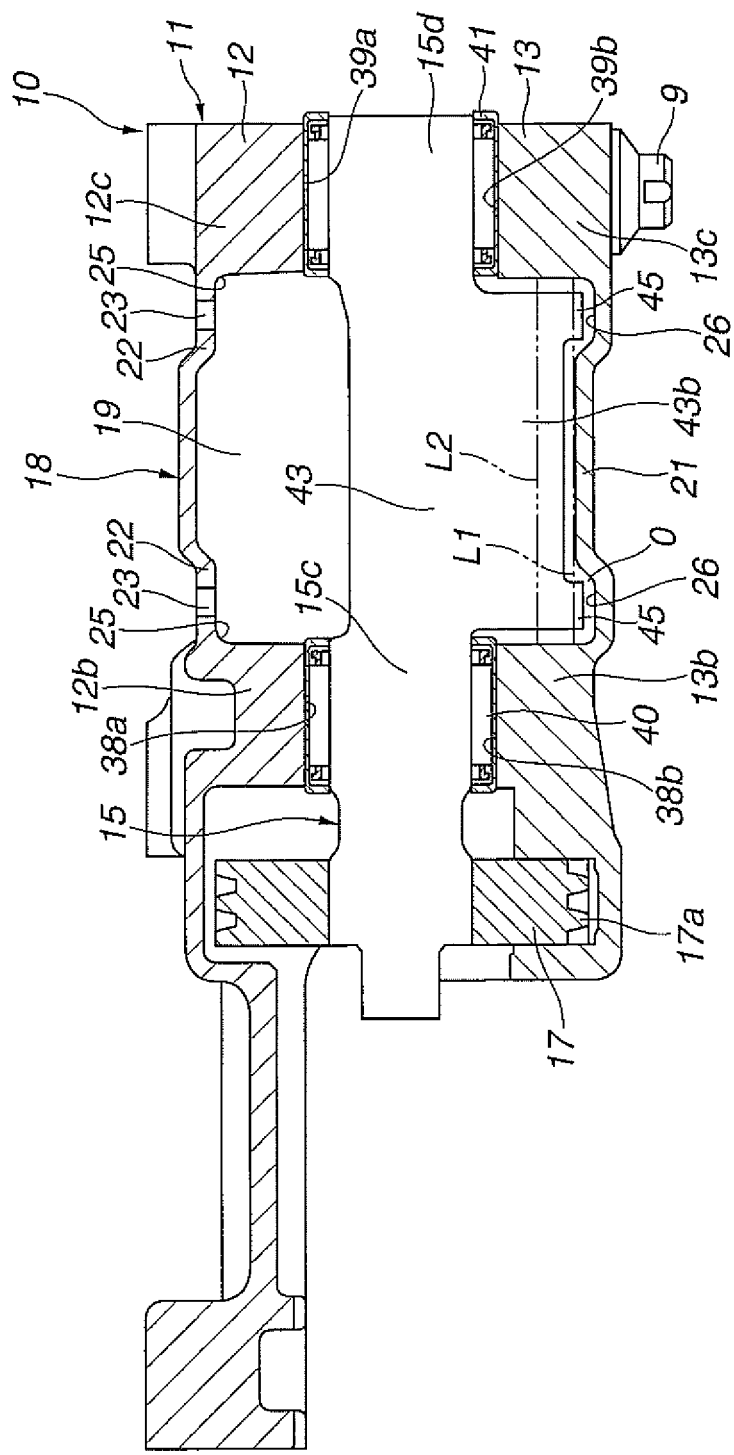
FIG. 10 is a section view corresponding to FIG. 6 but showing a balancer device according to a third embodiment of the present invention.

The third embodiment is basically the same as but different from the first embodiment in that: oil collection grooves 26 are formed at positions close to the needle bearings 40 and 41, i.e., in front and rear end regions of the weight accommodation room 19 in the axial direction of the driven shaft 15; oil introduction holes 23 are formed at substantially the same positions as the oil collection grooves 26 in the axial direction of the driven shaft 15; and protrusions 45 are formed on front and rear end regions of the driven-side counter weight 43 so as to correspond in position to the respective oil collection grooves 26 as shown in FIG. 10. The generation point of the oil mist or splash becomes close to the location of the needle bearing 40, 41 as the oil collection grooves 26 and the protrusions 45 are arranged close to the needle bearings 40 and 41. As the oil introduction holes 23 and the oil collection grooves 26 are arranged at substantially the same axial positions, most of the oil O introduced through the oil introduction holes 23 naturally flows to the oil collection groove 26 under its own weight and can be collected in the oil collection grooves 26. It is thus possible to more efficiently generate the mist or splash of the oil O and supply the oil O to the needle bearing 40, 41.

[Fourth Embodiment]

Figure 11:
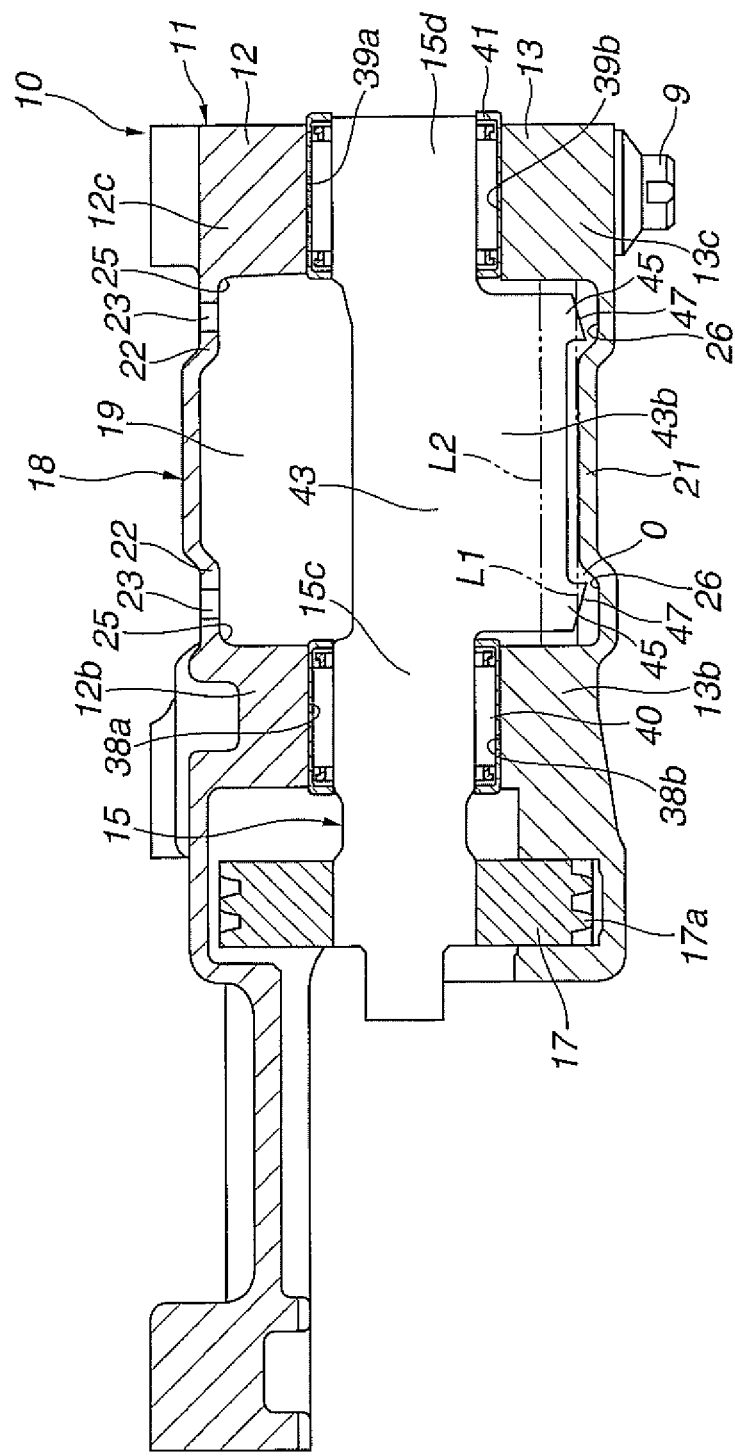
FIG. 11 is a section view corresponding to FIG. 6 but showing a balancer device according to a fourth embodiment of the present invention.

The fourth embodiment is basically the same as but different from the third embodiment in that that: the protrusions 45 have outer circumferential surfaces 47 inclined downwardly toward the respective needle bearings 40 and 41 as shown in FIG. 11. When the oil O is agitated by the protrusions 45, the resulting mist or splash of the oil O can guided to the needle bearings 40 and 41 by these inclined outer circumferential surfaces 47 of the protrusions 45. It is thus possible to more efficiently supply the oil O to the needle bearing 40, 41.

[Fifth Embodiment]

Figure 12:
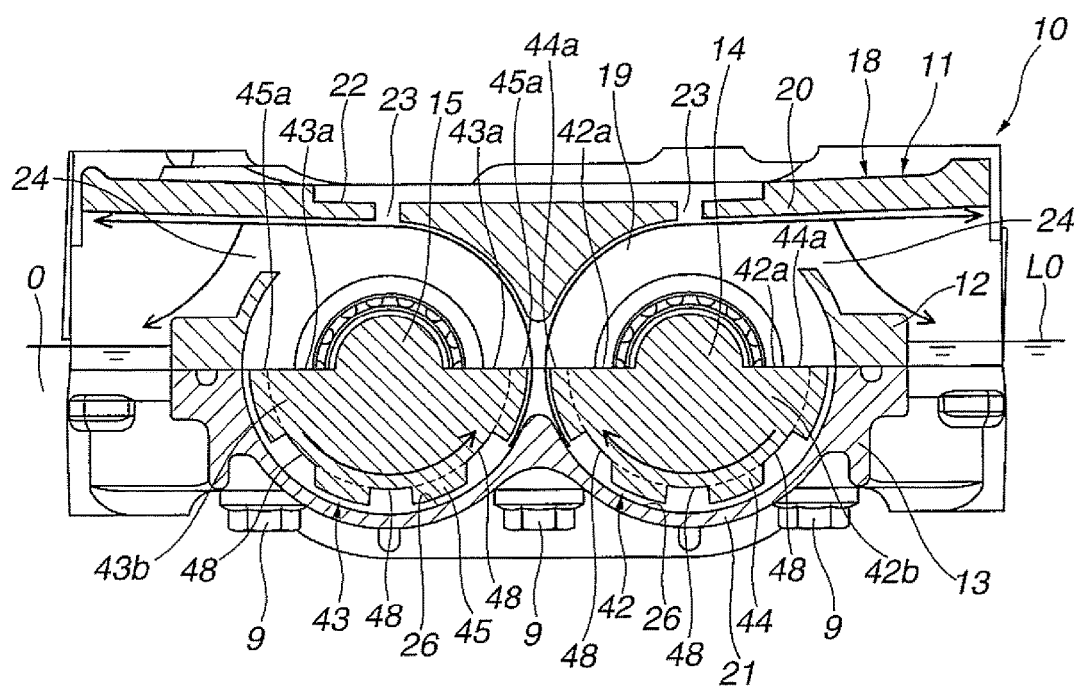
FIG. 12 is a section view corresponding to FIG. 7 but showing a balancer device according to a fifth embodiment of the present invention.

The fifth embodiment is basically the same as but different from the first embodiment in that: three concave agitation grooves 48 are formed in the outer circumferential surface of the protrusion 45 as shown in FIG. 12. In the fifth embodiment, the agitation grooves 48 are rectangular in cross section and are located at substantially equally spaced positions in the circumferential direction of the protrusion 45. By the formation of the agitation grooves 48, the outer circumferential surface of the protrusion 45 becomes uneven. It is thus possible to increase the number of contact of the outer circumferential surface of the protrusion 45 with the oil O in the weight accommodation room 19 and improve the efficiency of generation of the oil mist or splash O.

Although three agitation grooves 48 are formed in the protrusion 45 in the fifth embodiment, there is no particular limitation on the number of agitation grooves 48 in the protrusion 45. A plurality of agitation groove 48 can be formed in the protrusion 45.

[Sixth Embodiment]

Figure 13:
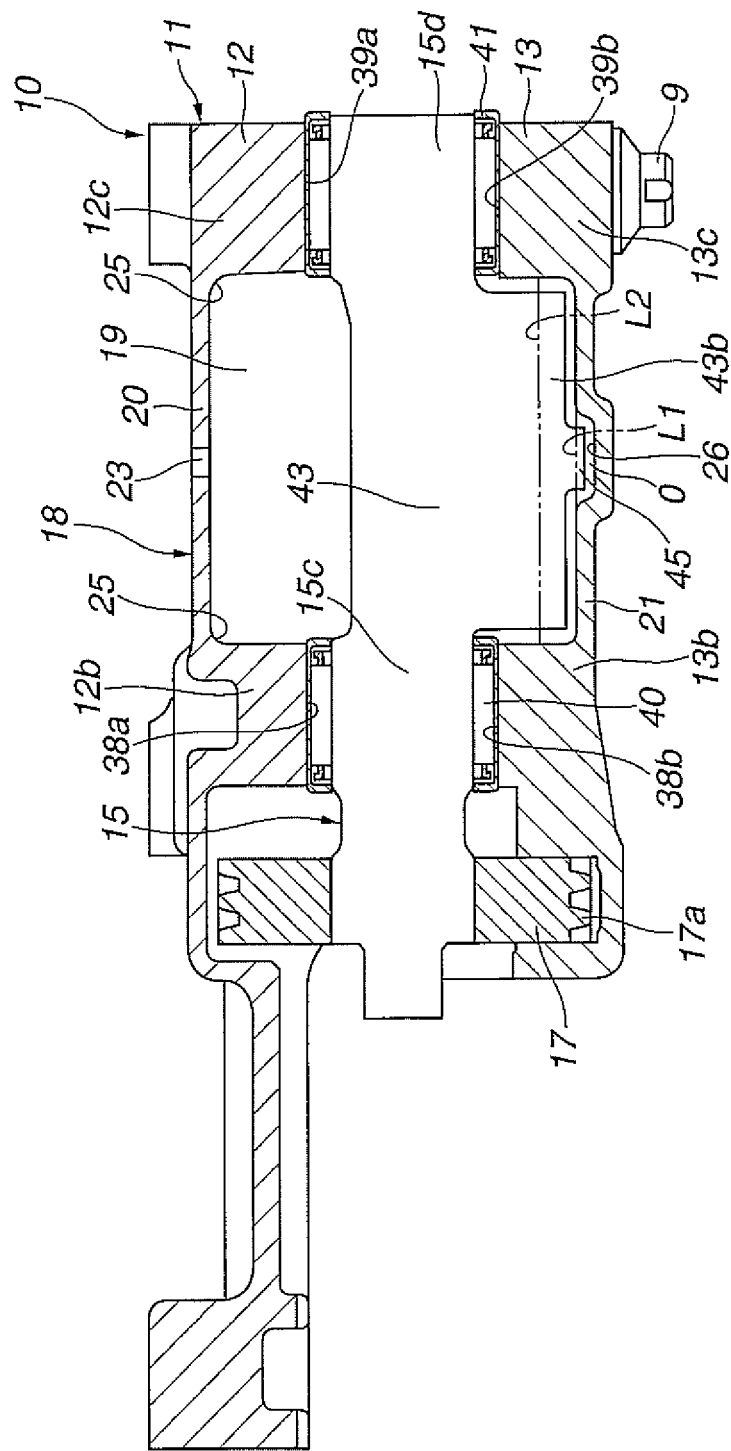
FIG. 13 is a section view corresponding to FIG. 6 but showing a balancer device according to a sixth embodiment of the present invention.

The sixth embodiment is basically the same as but different from the first embodiment in that: the oil introduction holes 23 are directly made in a flat region of the upper circumferential wall 20 without the formation of the recessed portion 22 as shown in FIG. 13. As compared to the first embodiment where the oil O from the internal combustion engine 1 is positively introduced into the weight accommodation room 19 by the recessed portion 22, the amount of introduction of the oil O into the weight accommodation room 19 becomes decreased in the sixth embodiment. In the sixth embodiment, however, the amount of introduction of the oil O into the weight accommodation room 19 can be regulated properly even when a large amount of the oil O is dropped from the internal combustion engine 1. It is thus possible to suppress excessive friction between the oil O and the driven-side counter weight 43 and avoid redundant load of the driven-side counter weight 43 for improvement of fuel efficiency.

[Seventh Embodiment]

Figure 14:
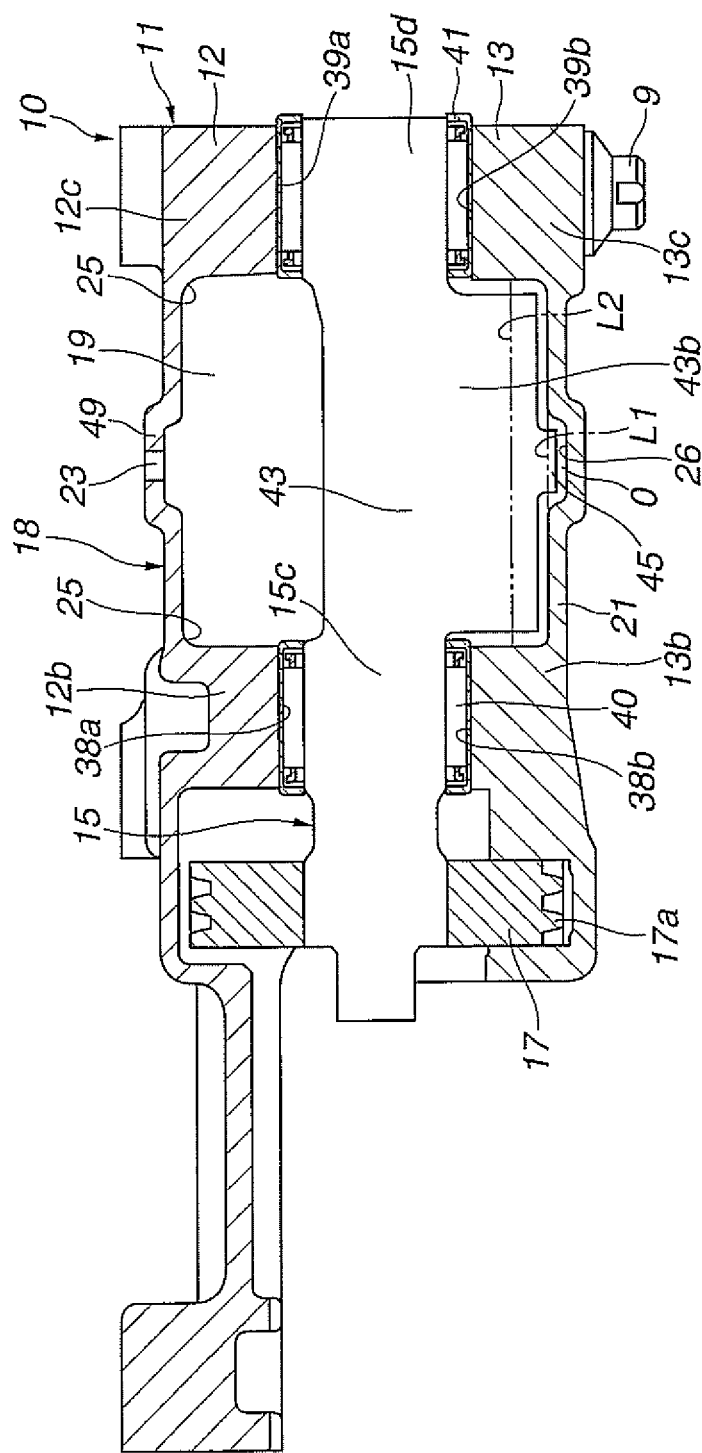
FIG. 14 is a section view corresponding to FIG. 6 but showing a balancer device according to a seventh embodiment of the present invention.

The seventh embodiment is basically the same as but different from the first embodiment in that: a protruding portion 49 is formed on the outer circumferential surface of the upper end region of the upper circumferential wall 20 in place of the recessed portion 22; and the oil introduction hole 23 is formed in the protruding portion 49 as shown in FIG. 14. As the protruding portion 40 interferes with the flow of the oil O from the outer (upper) circumferential surface of the upper circumferential wall 20 to the oil introduction hole 23, the amount of introduction of the oil O into the weight accommodation room 19 becomes smaller in the seventh embodiment than in the sixth embodiment. It is thus possible to, even when a significantly large amount of the oil O is dropped from the internal combustion engine 1, properly regulate the amount of introduction of the oil O into the weight accommodation room 19 and prevent excessive friction between the oil O and the driven-side counter weight 43.

[Eighth Embodiment]

The eighth embodiment is characterized as follows.

Figure 15:
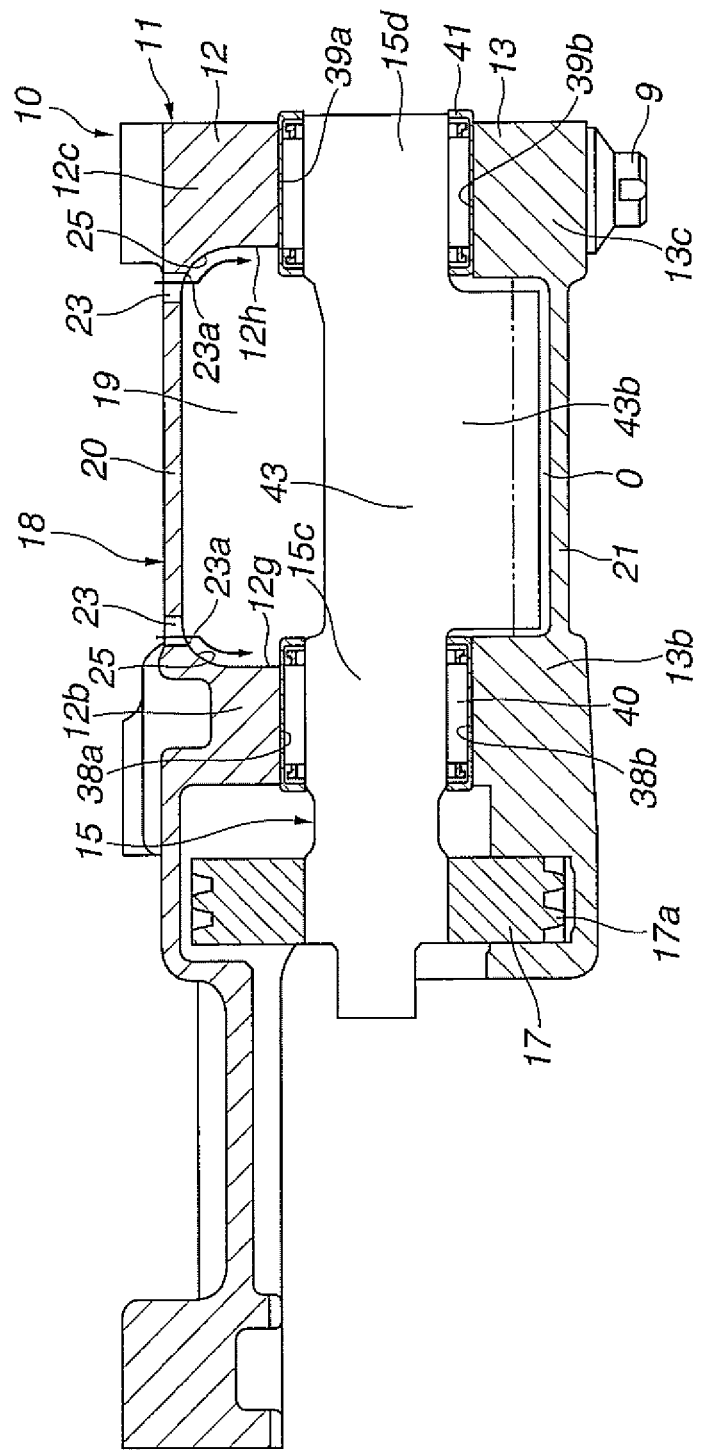
FIG. 15 is a section view corresponding to FIG. 6 but showing a balancer device according to an eighth embodiment of the present invention.

As shown in FIG. 15, the oil introduction holes 23 are formed at positions close to the first and second cross deck portions 12b and 12c of the upper housing member 12, i.e., close to the needle bearings 40 and 41, with lower (downstream-side) opening edges 23a of the oil introduction holes 23 being connected to the chamfered surfaces 25 of the upper housing member 12.

The needle bearings 40 and 41 are arranged such that end portions of the needle bearings 40 and 41 facing the weight accommodation room 19 protrude from opposing wall surfaces 12g and 12h of the first and second cross deck portions 12b and 12c of the upper housing member 12 toward the center of the weight accommodation wall 19 (i.e. the end portions of the needle bearings 40 and 41 facing the weight accommodation room 19 are located closer to the center of the weight accommodation wall 19 than the wall surfaces 12g and 12h of the first and second cross deck portions 12b and 12c).

Further, the first and second cross deck portions 13b and 13c of the lower housing member 13 are arranged to protrude toward the center of the weight accommodation wall 19 from the end portions of the needle bearings 40 and 41 facing the weight accommodation room 19 (i.e. the first and second cross deck portions 13b and 13c of the lower housing member 13 are located closer to the center of the weight accommodation wall 19 than the end portions of the needle bearings 40 and 41 facing the weight accommodation room 19).

As in the case of the first to seventh embodiments, most of the oil O introduced through the oil introduction holes 23 flows down to the lower side of the weight accommodation room 19 and is agitated by the driven-side counter weight 43 for oil mist lubrication of the needle bearings 40 and 41. On the other hand, some of the oil O remains in the vicinities of the lower opening edges 23a of the oil introduction holes 23 by the action of surface tension. In the eighth embodiment, such remaining oil O flows to the wall surfaces 12g and 12h of the first and second cross deck portions 12b and 12c along the inner circumferential surface of the upper circumferential wall 20 as the oil introduction holes 23 are arranged close to the wall surfaces 12g and 12h of the first and second cross deck portions 12b and 12c. In particular, the lower opening edges 23a of the oil introduction holes 23 are connected to the chamfered surfaces 25 so as to promote the flow of the oil O to the wall surfaces 12g and 12h of the first and second cross deck portions 12b and 12c by the smoothly inclined chamfered surfaces 25. Then, the oil O flows down to the needle bearings 40 and 41 along the wall surfaces 12g and 12h under its own weight and lubricates the needle bearings 40 and 41.

Namely, the above direct lubrication technique is adopted in combination with the oil mist lubrication technique in the eighth embodiment. By combination of these two lubrication techniques, it is possible to more properly lubricate the needle bearings 40 and 41 and further improve the reliability of lubrication of the needle bearings 40 and 41.

As the needle bearings 40 and 41 are arranged to protrude from the wall surfaces 12g and 12h of the upper housing member 12 toward the center of the weight accommodation room 19, the oil O can be easily supplied from the wall surfaces 12g and 12h of the first and second cross deck portions 12b and 12c to the vicinities of the needle bearings 40 and 41. In addition, it is less likely that the oil O supplied to the vicinities of the needle bearings 40 and 41 will flow down as the first and second cross deck portions 13b and 13c of the lower housing member 13 are arranged to protrude from the needle bearings 40 and 41 toward the center of the weight accommodation wall 19. It is thus possible to easily supply the oil O to the needle bearings 40 and 41 for further improvement of lubrication reliability.

[Ninth Embodiment]

Figure 16:
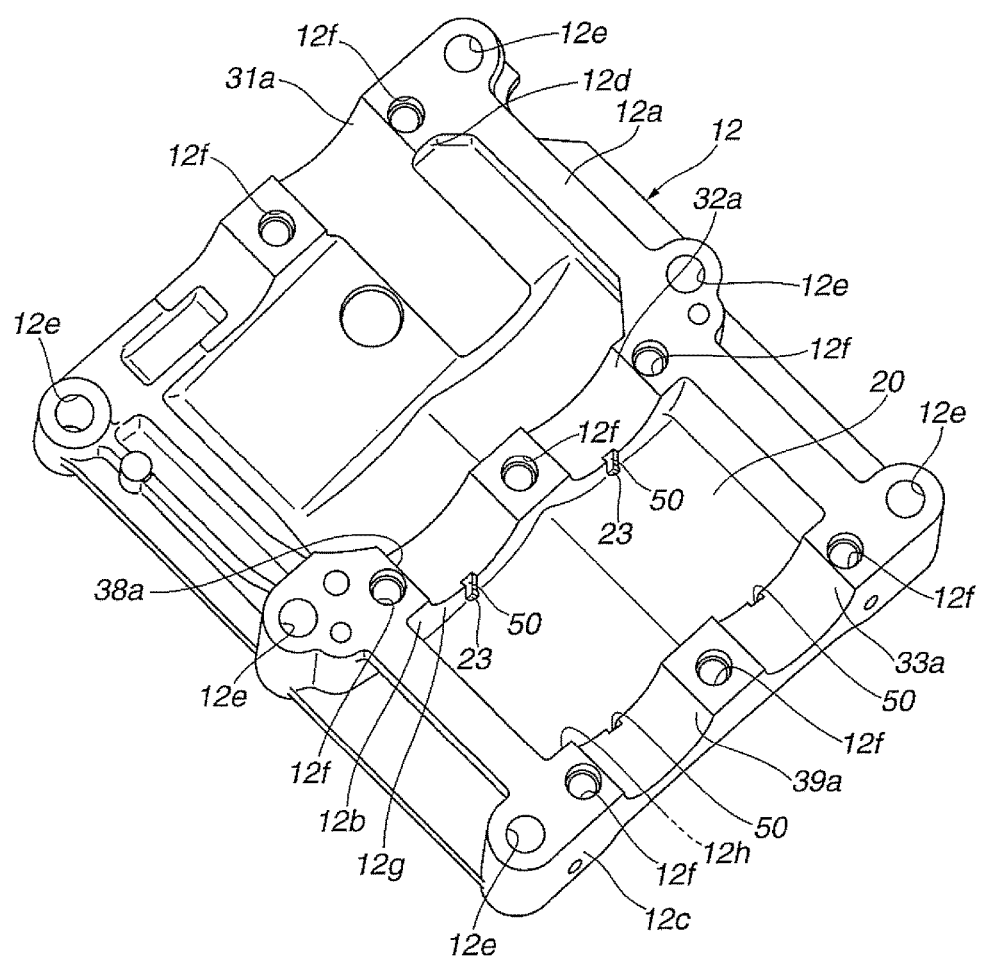
FIG. 16 is a perspective view of an upper housing member of a balancer device, as viewed from its inner peripheral side, according to a ninth embodiment of the present invention.
Figure 17:
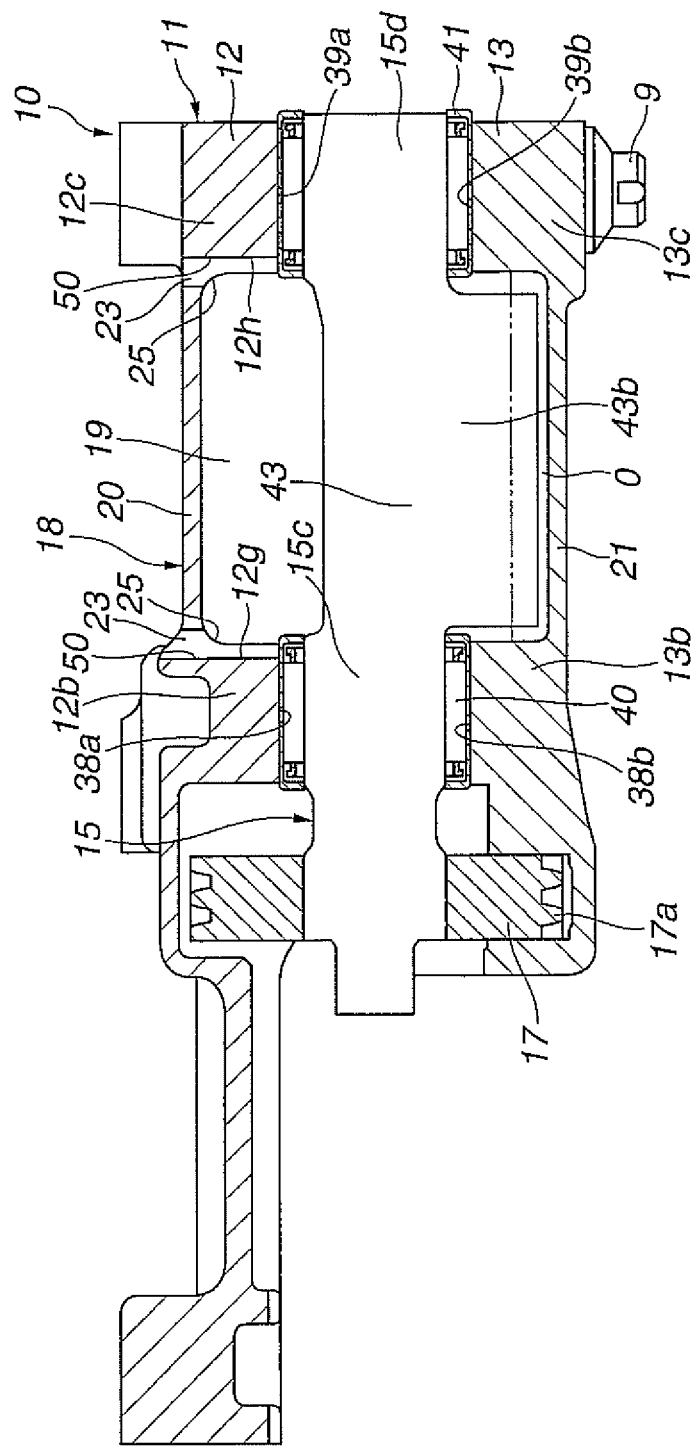
FIG. 17 is a section view corresponding to FIG. 6 but showing the balancer device according to the ninth embodiment of the present invention.

The ninth embodiment is basically the same as but different from the eighth embodiment in that: guide grooves 50 are formed in the wall surfaces 12g and 12h of the first and second cross deck portions 12b and 12c of the upper housing member 12 so as to provide communication between the oil introduction holes 23 and the bearing grooves 38a and 39a as shown in FIGS. 16 and 17. In the ninth embodiment, each of the guide grooves 51 has a vertically elongated shape, with one end of the guide groove 50 being in communication with the oil introduction hole 23 and the other end of the guide groove 50 being in communication with the bearing groove 38a, 39a in which the needle bearing 40, 41 is supported. As a larger amount of the oil O can be directly supplied to the needle bearings 40 and 41 through these guide grooves 50, it is possible to further improve the efficiency and reliability of lubrication of the needle bearings 40 and 41.

It is herein noted that, although some of the configurations of the first to seventh embodiments (such as oil collection groove 26 and protrusion 45) are eliminated from the eighth and ninth embodiments, any of the configurations of the first to seventh embodiments can be applied to the eighth and ninth embodiments as appropriate.

[Tenth Embodiment]

The eighth embodiment is basically the same as but different from the first embodiment in that two pairs of drive—and driven-side counter weights are utilized to reduce secondary vibration as shown in FIGS. 18 to 22.

More specifically, parts of the housing 11 located rear of the second cross deck portions 12c and 13c are enlarged. There is a second weight accommodation room 51 defined in these enlarged parts of the housing 11. Second drive—and driven-side counter weights 52 and 53 are rotatably accommodated in the second weight accommodation room 51.

Figure 18:
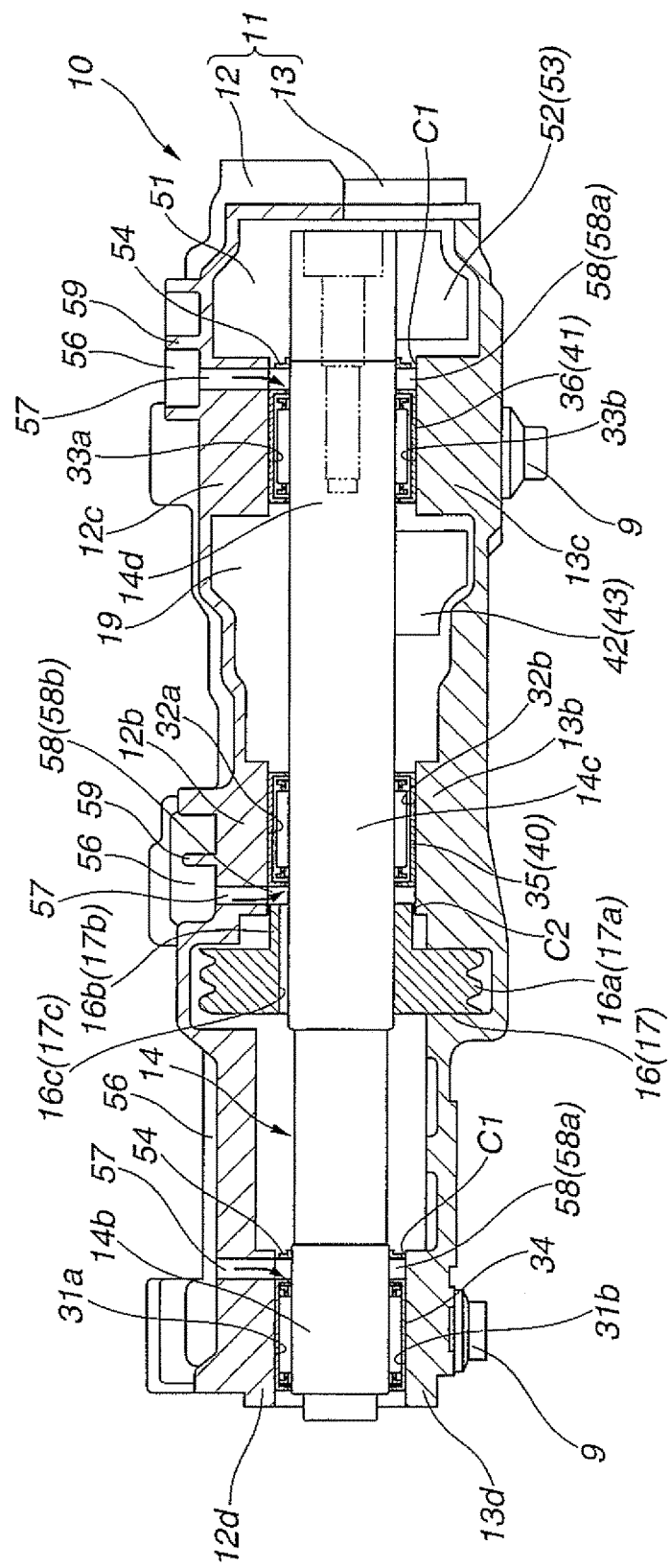
FIG. 18 is a section view of a balancer device according to a tenth embodiment of the present invention as taken along line E-E of FIG. 20.

The second drive-side counter weight 52 is the same in shape as the first-mentioned drive-side counter weight 42. As shown in FIG. 18, the second drive-side counter weight 52 is supported in a cantilever state by the needle bearing 36 and the journal portion 14d of the drive shaft 14. The second drive-side counter weight 52 is fixed to the drive shaft 14 by a fixing bolt as shown by a two-dot chain line in FIG. 18.

Similarly, the second driven-side counter weight 53 is the same in shape as the first-mentioned driven-side counter weight 43. As in the case of the second drive-side counter weight 52, the second driven-side counter weight 53 is supported in a cantilever state by the needle bearing 41 and the journal portion 15d of the driven shaft 15 and is fixed to the driven shaft 15 by a fixing bolt.

In the tenth embodiment, the width of the cross deck portion 12b, 13b, 12c, 13c, 12d, 13d in the axial direction of the shaft 14, 15 is set longer than the width of the needle bearing 34, 35, 36, 40, 41 in the axial direction of the shaft 14, 15.

Figure 19:
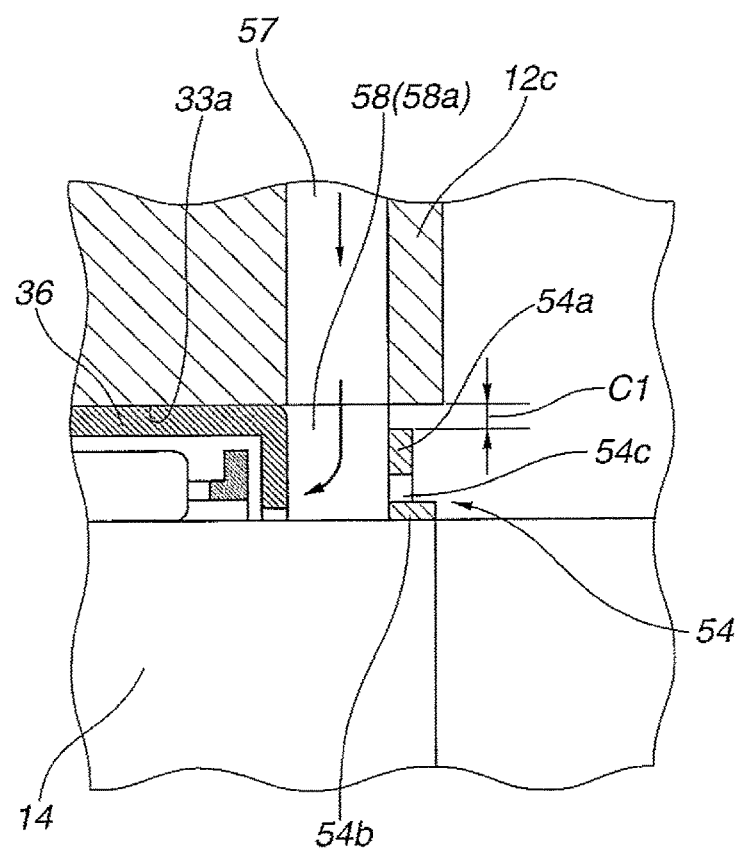
FIG. 19 is an enlarged view showing the vicinity of a ring in the balancer device according to the tenth embodiment of the present invention.

As shown in FIGS. 18 and 19, rings 54 are fitted on the drive and driven shafts 14 and 15 at positions corresponding to the first, third and fifth bearing grooves 31a, 31b, 33a, 33b, 39a and 39b. The rings 54 are made by pressing a steel material and each includes a thin circular annular plate portion 54a and a protruding portion 54b axially protruding in a flange shape from an inner circumference of the annular plate portion 54a. The outer diameter of the annular plate portion 54a is set slightly smaller than the diameter of the bearing groove 31a, 31b, 33a, 33b, 39a, 39b so that the annular plate portion 54a is placed in the bearing grooves 31a, 31b, 33a, 33b, 39a, 39b with a slight clearance C1 left therebetween. The inner circumference of the protruding portion 54b is press-fitted on the outer circumference of the shaft 14, 15 such that the ring 54 rotates together with the shaft 14, 15. In each ring 54, a small-diameter air vent through hole 54c is made through a connection area between the annular plate portion 54a and the protruding portion 54b by punching during the press forming.

Further, the drive-side gear 16 includes a cylindrical boss portion 16b formed protrudingly on an end surface thereof facing the needle gear 35 as shown in FIG. 18. The outer diameter of the boss portion 16b is set slightly smaller than the inner diameter of the second bearing groove 32a, 32b so that a distal (rear) end region of the boss portion 16b is inserted in the second bearing grooves 32a, 32b with a slight clearance C2 left therebetween. A narrow air vent groove 16c is cut in the drive-side gear 16 from the distal end of the boss portion 16b to the end of the drive-side gear 16 opposite from the boss portion 16b. Alternatively, a cut may be formed in a part of the boss portion 16b although not specifically shown in the drawings.

The driven-side gear 17 has the same structure as the drive-side gear 16 and includes a boss portion 17b and a narrow air vent groove 17c.

Figure 20:
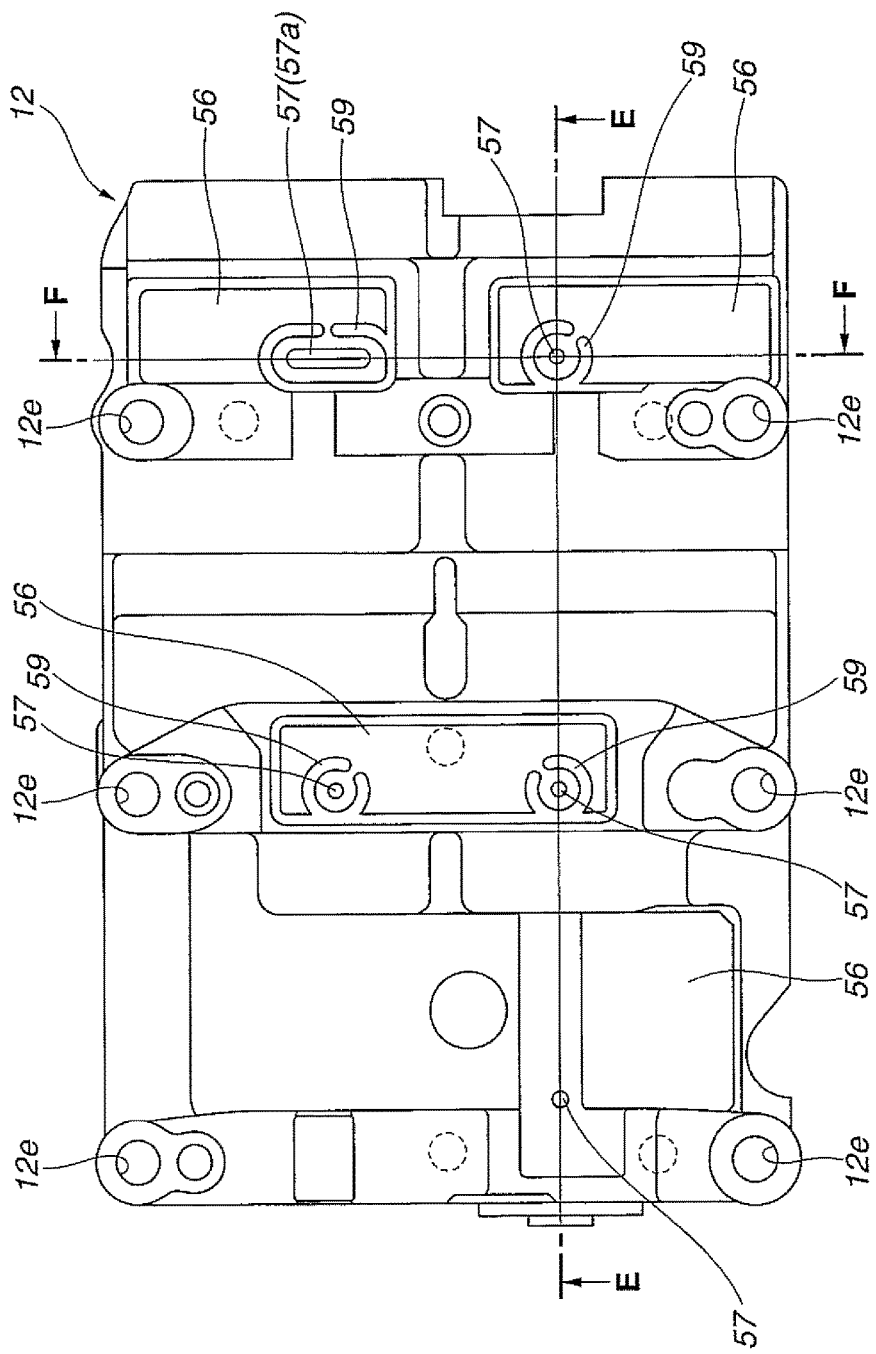
FIG. 20 is a plan view of the balancer device according to the tenth embodiment of the present invention.
Figure 21:
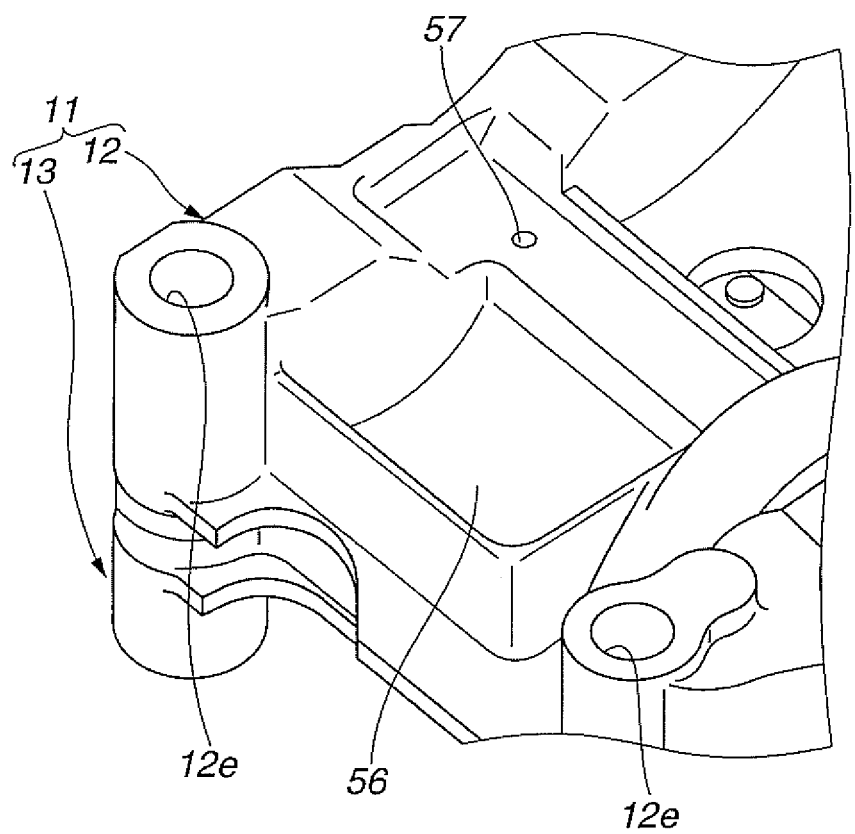
FIG. 21 is a perspective view showing the vicinity of a pool in the balancer device according to the tenth embodiment of the present invention.

As shown in FIGS. 20 and 21, four pools 56 are formed in the upper (outer) surface of the upper housing member 20 to store the oil O from the internal combustion engine 1. The pools 56 are made by depressing given regions of the upper (outer) surface of the upper housing member 20 and are located above the needle bearings 34, 35, 36, 40, 41 so as to, when viewed from above, partially overlap the needle bearings 34, 35, 36, 40, 41.

Figure 22:
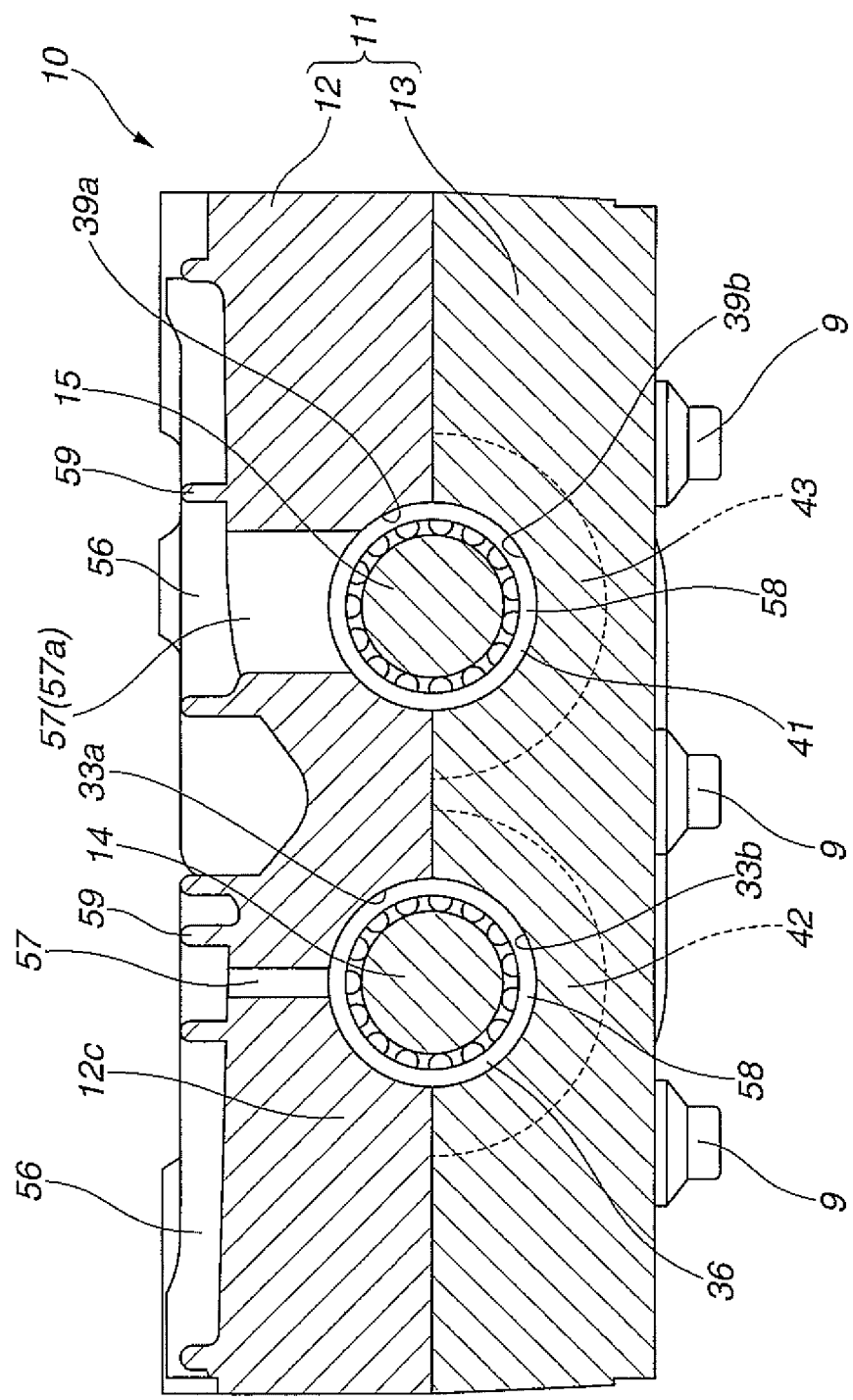
FIG. 22 is a section view of the balancer device according to the tenth embodiment of the present invention as taken along line F-F of FIG. 20.

In the tenth embodiment, five introduction parts are formed in the bottoms of the pools 56 for direct introduction of the oil O from the pools 56 to the needle bearings 34, 35, 36, 40, 41. As shown in FIGS. 18 and 22, each of the introduction parts includes an oil introduction hole 57 and an oil reservoir 58. The oil introduction hole 57 is opened at an upper side of the upper housing member 12 and is connected at an upper end thereof to the pool 56. The oil reservoir 58 is defined as a circular annular space by the shaft 14, 15 and the bearing grooves 31a, 31b, 32a, 32b, 33a, 33d, 38a, 38b, 39a, 39b and is connected to a lower end of the oil introduction hole 57.

As shown in FIGS. 21 and 22, one of the oil introduction holes 57 corresponding to the needle bearing 41 (hereinafter also referred to as "oil introduction hole 57a") is integrally formed during the die casting of the upper housing member 12 such that the oil introduction hole 57a has an elongated hole shape to introduce a relatively large amount of the oil O into the oil reservoir 58. By the formation of such an elongated oil introduction hole 57a, the air accumulated in the oil reservoir 58 can be separated and floated up to supply the clean oil to the needle bearing 41. The other four oil introduction holes 57 are formed into a substantially circular cross-section shape by drilling. The oil introduction hole 57a may alternatively be formed into a substantially circular cross-section shape in the same manner as the other oil introduction holes 57.

Moreover, cylindrical weir portions 59 are formed around upstream opening ends of the oil introduction holes 57 as specifically shown in FIG. 20. Each of the weir portions 59 is in the form of a protrusion wall protruding from the bottom surface of the pool 56 and surrounding the oil introduction hole 57, with a part of the weir portion 59 being opened, so as to regulate the amount of introduction of the oil O into the oil reservoir 58.

Three of the oil reservoirs 58 corresponding to the needle bearings 34, 36 and 41 (hereinafter also referred to as "oil reservoirs 58a") are each closed at one end by the ring 54 and brought into communication at the other end with the needle bearing 34, 36, 41. The other two oil reservoirs 58 corresponding to the needle bearings 35 and 40 (hereinafter also referred to as "oil reservoirs 58b") are each closed at one end by the boss portion 16b, 17b of the gear 16, 17 and brought into communication at the other end with the needle bearing 35, 40.

Consequently, the oil O is dropped from the internal combustion engine 1 into the pools 56 and introduced into the oil reservoirs 58 through the oil introduction holes 57. At this time, the amount of the oil O introduced into the oil reservoirs 58 is regulated and optimized as appropriate by the oil introduction holes 57 and the weirs 59. The oil O introduced into the oil reservoirs 58 can be properly and directly supplied to the needle bearings 34, 35, 36, 40, 41 by free flow as the oil reservoirs 58 arc arranged facing the axial ends of the needle bearings 34, 35, 36, 40, 41. It is thus possible to improve the reliability of lubrication of the needle bearing 34, 35, 36, 40, 41.

As the air in the oil O can be separated and reduced by once storing the oil O in the wide pool 56, it is possible to supply the deaerated clean oil O and smoothly lubricate the needle bearing 34, 35, 36, 40, 41 for improvement of lubrication reliability.

In the tenth embodiment, the oil reservoir 58a is defined by the ring 54 in which the air vent through hole 54c is formed; whereas the oil reservoir 58b is defined by the gear 16, 17 in which the air vent groove 16c, 17c is formed. By this air vent system, the air in the oil O can be discharged from the oil reservoir 58 through the air vent through hole 54c or the air vent groove 16c, 17c. It is thus possible to achieve the more reliable supply of the oil O to the needle bearing 34, 35, 36, 40, 41 for improvement of lubrication reliability.

Furthermore, the clearance C1, C2 is formed on a side of the oil reservoir 58 opposite from the needle bearing 34, 35, 36, 40, 41 so that, even when the oil O reaches a high temperature under the influence of frictional heat caused by operation of the needle bearing 34, 35, 36, 40, 41, the high-temperature oil O can be discharged to the outside of the oil reservoir 58 through the clearance C1, C2. It is thus possible to prevent the needle bearing 34, 35, 36, 40, 41 from becoming high in temperature and improve the durability and reliability of the needle bearing 34, 35, 36, 40, 41.

It is further possible to reduce component count for reduction of manufacturing/assembling cost as the oil reservoir 58 is defined by the boss portion 16b, 17b of the gear 16, 17.

Although the oil reservoir 58b is defined by insertion of the boss portion 16b, 17b of the gear 16, 17 in the bearing grooves 32a, 32b, 38a, 38b in the tenth embodiment, it is alternatively feasible to define the oil reservoir 58b by setting the outer diameter of the boss portion 16b, 17b larger than the inner diameter of the bearing grooves 32a, 32b, 38a, 38b and placing an end surface of the boss portion 16b, 17b in face-to-face arrangement with an end surface of the second cross deck portion 12b, 13b.

[Eleventh Embodiment]

Figure 23:
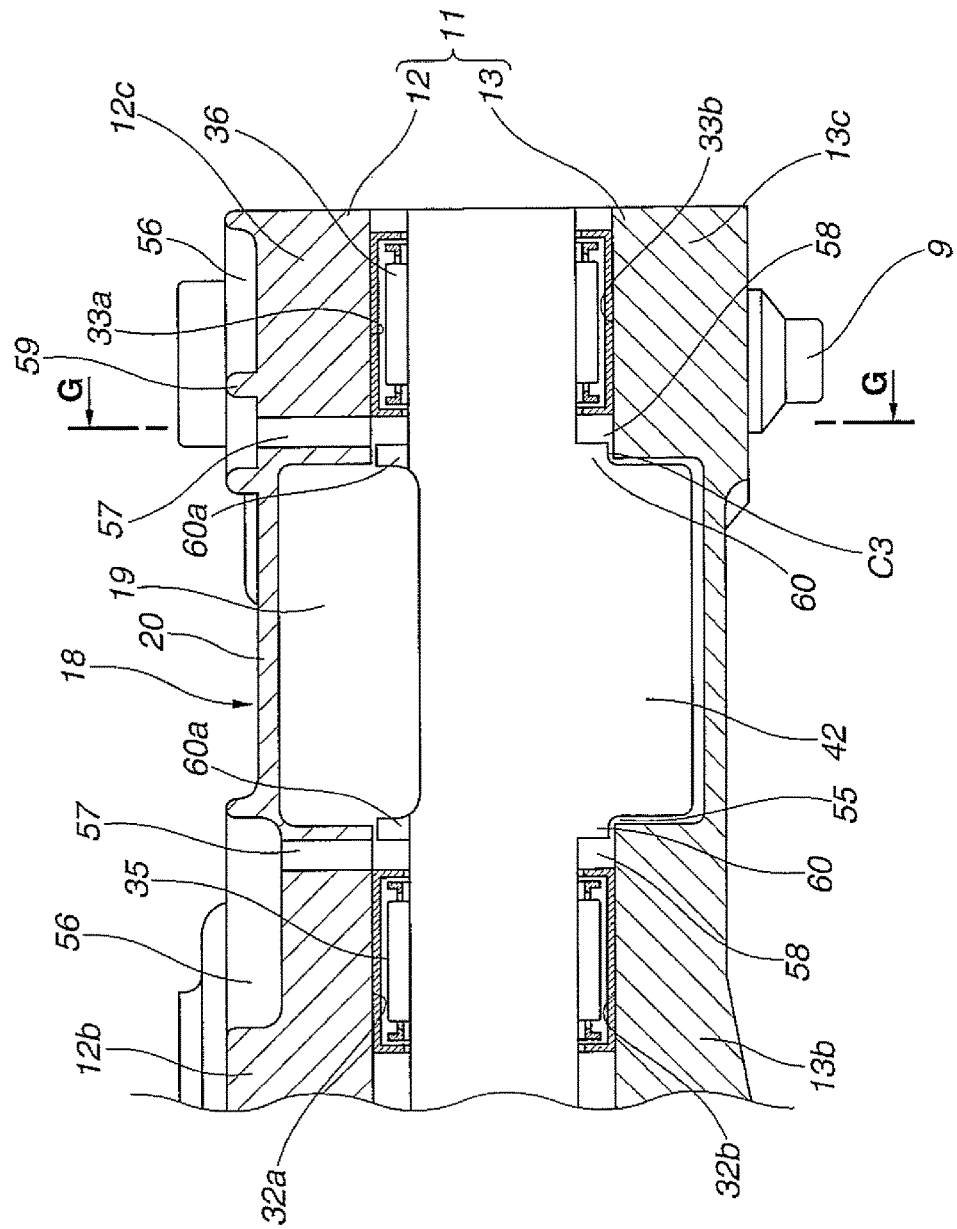
FIG. 23 is a section view of a balancer device according to an eleventh embodiment of the present invention.
Figure 24:
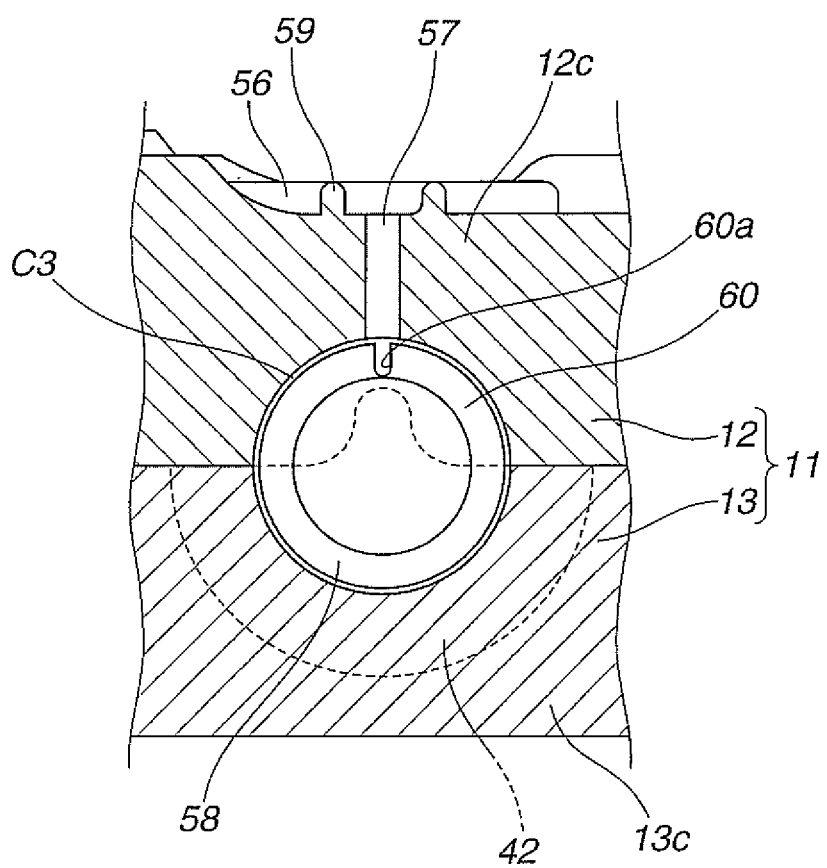
FIG. 24 is a section view of the balancer device according to the eleventh embodiment of the present invention as taken along line G-G of FIG. 23.

The eleventh embodiment is basically the same as but different from the tenth embodiment in that: one pair of drive—and driven-side counter weights are utilized to reduce secondary vibration as in the case of the first embodiment; and thin disc-shaped flange walls 60 are formed on both axial end regions of the drive—and driven counter weights 42 and 43 as shown in FIGS. 23 and 24. The outer diameter of the flange wall 60 is set slightly smaller than the inner diameter of the bearing groove 32a, 32b, 33a, 33b, 38a, 38b, 39a, 39b so that the flange wall 60 is inserted in the bearing grooves 32a, 32b, 33a, 33b, 38a, 38b, 39a, 39b with a slight clearance C3 left therebetween as shown in FIG. 24. As shown in FIG. 23, one axial ends of the oil reservoirs 58 adjacent to the weight accommodation room 19 are closed by the flange walls 60. Air vent grooves 60a are cut in the flange walls 60 at positions different from the positions of the counter weights 42 and 43.

As mentioned above, the flange walls 60 of the counter weights 42 and 43 are utilized as the partitions of the oil reservoirs 58 in the eleventh embodiment. It is thus possible in the eleventh embodiment to obtain the same effects as in the tenth embodiment and, at the same time, reduce component count for reduction of manufacturing/assembling cost.

Figure 25:
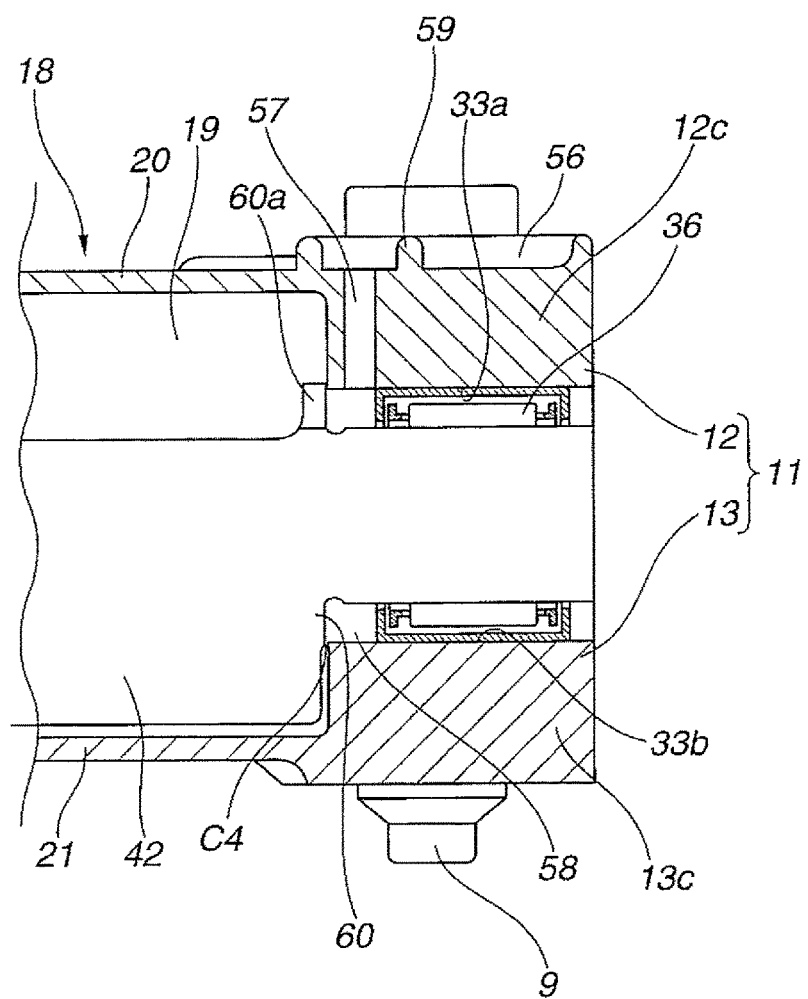
FIG. 25 is a section view of a balancer device according to a modification of the eleventh embodiment of the present invention.

Although one axial end of the oil reservoir 58 is closed by insertion of the flange wall 60 into the bearing grooves 32a, 32b, 33a, 33b, 38a, 38b, 39a, 39b in the eleventh embodiment, it is alternatively feasible to close one axial end of the oil reservoir 58 by setting the outer diameter of the flange wall 60 larger than the inner diameter of the bearing grooves 32a, 32b, 33a, 33b, 38a, 38b, 39a, 39b and placing the flange wall 60 in face-to-face arrangement with the bearing grooves 32a, 32b, 33a, 33b, 38a, 38b, 39a, 39b as shown in FIG. 25. In this case, the high-temperature oil O can be discharged to the outside of the oil reservoir 58 through a clearance C4 between the face-to-face arrangement regions.

The configuration of the eleventh embodiment (i.e. the partitioning of the oil reservoir 58 by a portion of the counter weight) is applicable to the case where the counter weight is supported in a cantilever state as in the tenth embodiment.

Figure 26:
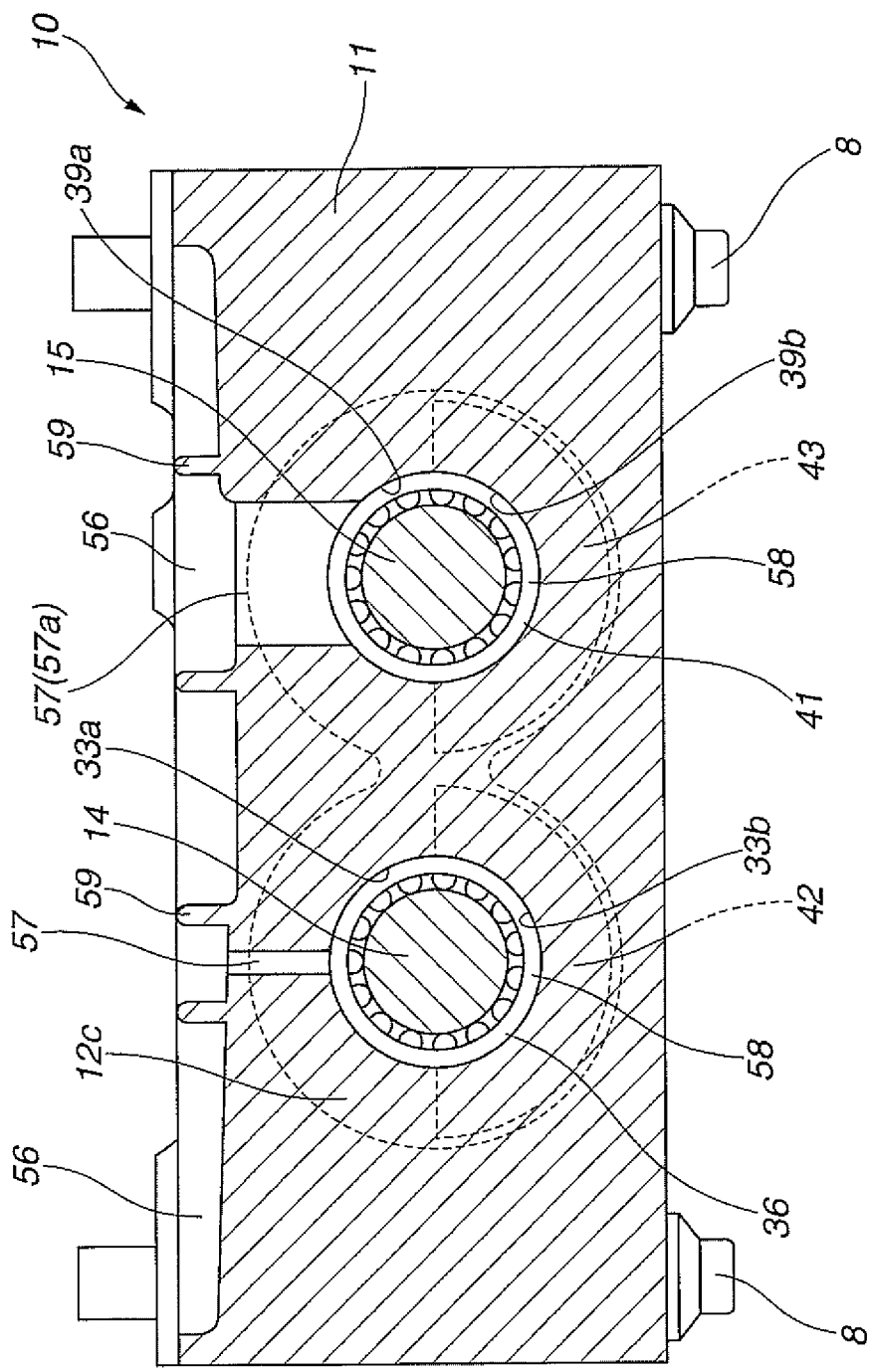
FIG. 26 is a section view of a balancer device according to a modification of the tenth or eleventh embodiment of the present invention.

It is also alternatively feasible to form the housing 11 as a so-called integrated housing without being divided into upper and lower housing members as shown in FIG. 26 although the housing 11 is constituted by the upper and lower housing members 12 and 13 in the tenth and eleventh embodiments.

[Twelfth Embodiment]

Figure 27:
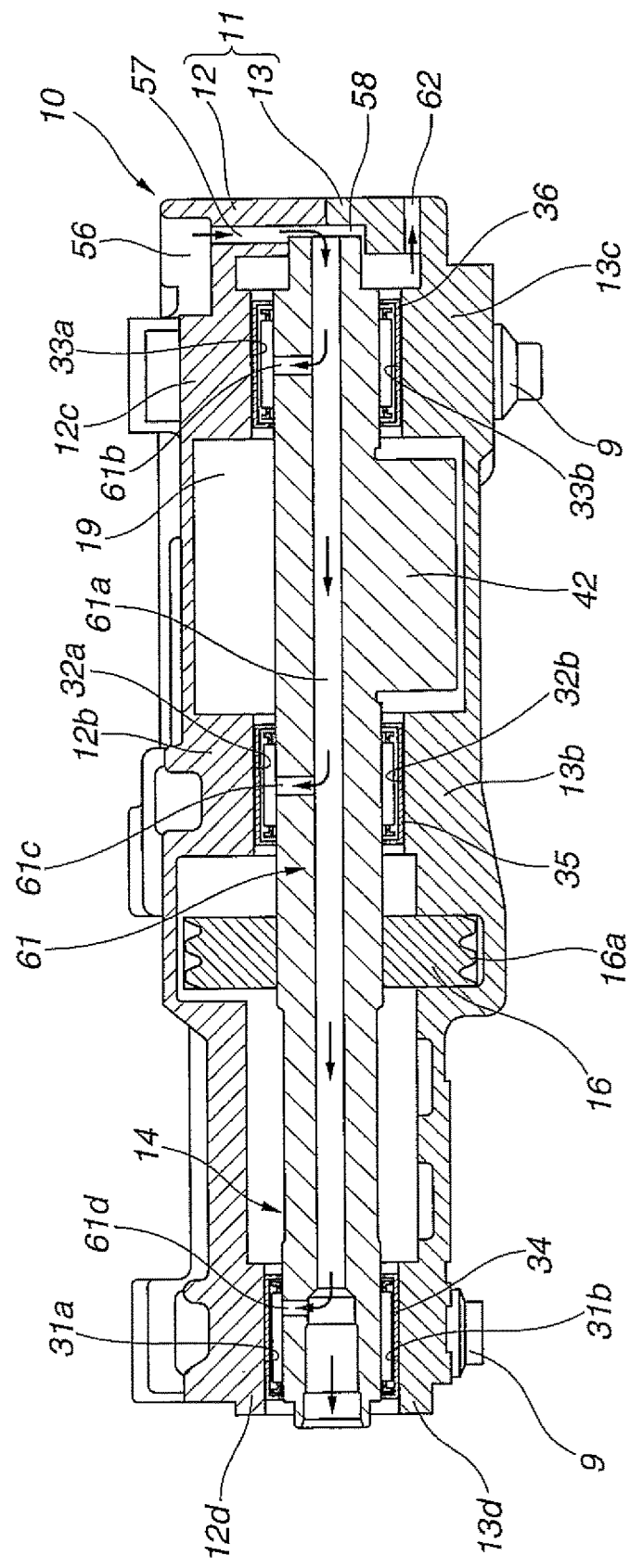
FIG. 27 is a section view of a balancer device according to a twelfth embodiment of the present invention as taken along line H-H of FIG. 29.
Figure 28:
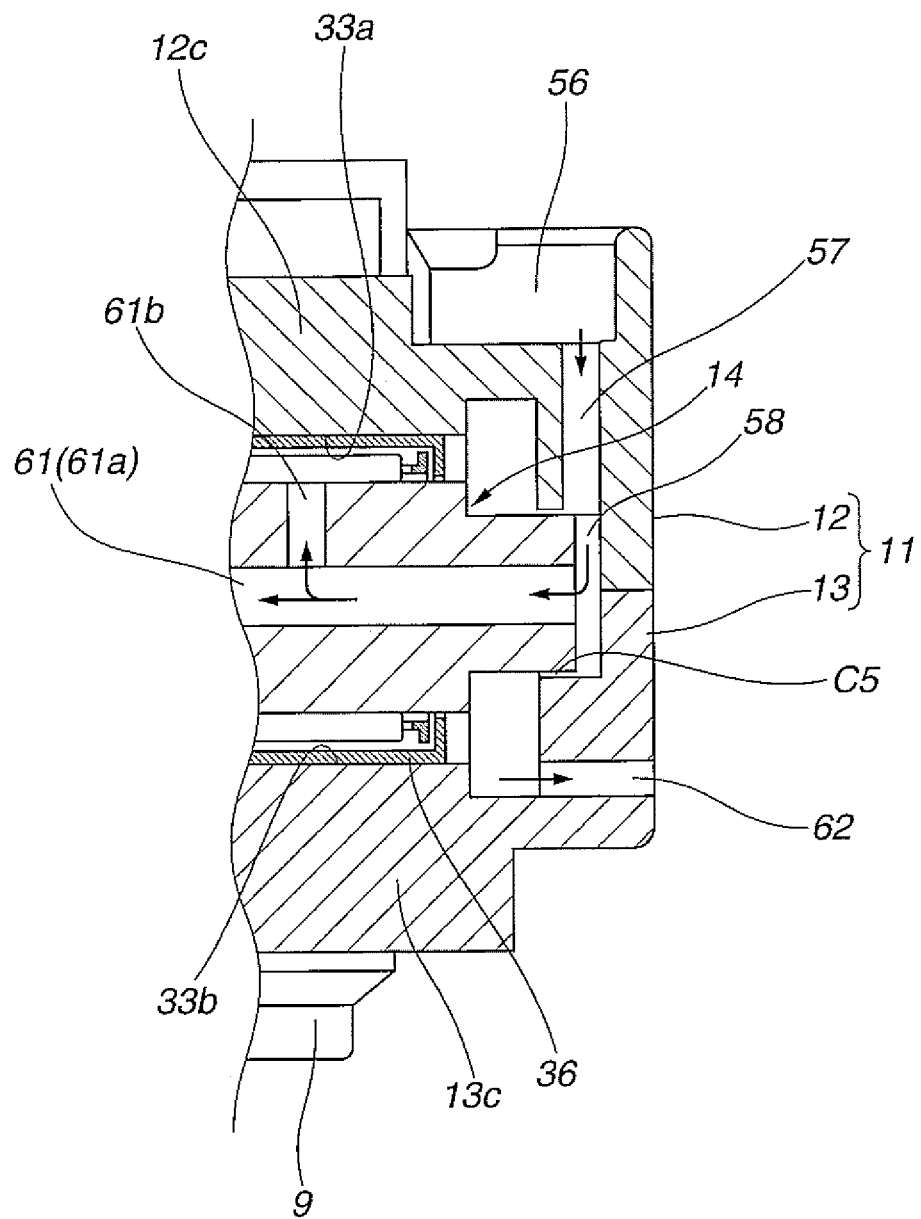
FIG. 28 is an enlarged view showing the vicinity of an introduction part in the balancer device according to the twelfth embodiment of the present invention.
Figure 29:
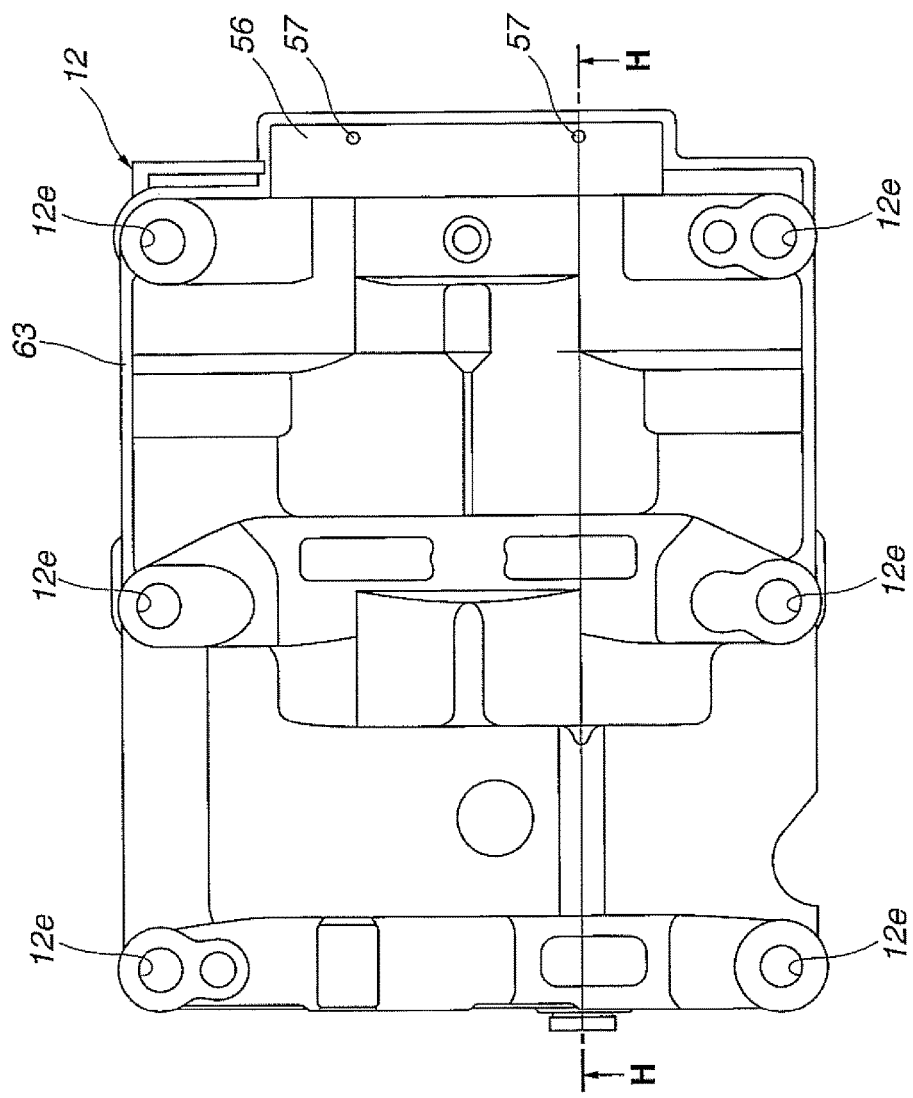
FIG. 29 is a plan view of the balancer device according to the twelfth embodiment of the present invention.

The twelfth embodiment is basically the same as but different from the eleventh embodiment in that: one introduction part (oil introduction hole 57 and oil reservoir 58) is provided for each of the drive and driven sides of the balancer device 10, rather than for each of the needle bearings 34, 35, 36, 40 and 41, as shown in FIGS. 27 to 29.

Hereinafter, the drive-side introduction part mainly explained below as the basic structure of the drive-side introduction part is the same as that of the driven-side introduction part.

As shown in FIG. 27, the introduction part includes, in addition to the oil introduction hole 57 and the oil reservoir 58, an oil supply path 61 arranged in communication with the oil reservoir 58 to directly supply the oil O from the oil reservoir 58 to the needle bearings 34, 35 and 36. The oil supply path 61 includes a main oil passage 61a extending through the axis of the drive shaft 14 and branch oil passages

61*b*, 61*c* and 61*d* extending radially outwardly from the main oil passage 61*a* and communicating with the inner circumferential surfaces of the needle bearings 34, 35 and 36.

By this oil introduction part, the oil O can be reliably supplied from the branch oil passage 61*b*, 61*c*, 61*d* to the needle bearing 34, 35, 36 under the pumping action caused due to centrifugal force by rotation of the drive shaft 14. It is thus possible to increase cooling performance by sufficient lubrication of the needle bearing 34, 35, 36 and improve the durability and reliability of the needle bearing 34, 35, 36.

In the twelfth embodiment, the flow passage area of the rear-side (downstream-side) branch oil passage 61*d* is set larger than that of the middle branch oil passage 61*c*; and the flow passage area of the middle branch oil passage 61*c* is set larger than that of the front-side (upstream-side) branch oil passage 61*b*. It is thus possible to uniformize the amount of introduction of the oil O to the needle bearings 34, 35 and 36.

Further, there is a slight clearance C5 left between the oil reservoir 58 and the drive shaft 14 such that the oil reservoir 58 is in communication with a drain hole 62 of the lower housing member 3 through the clearance C5 as shown in FIG. 28. The drain hole 62 is in communication with the outside of the housing 11 so that the air, impurities or contaminants in the oil O can be discharged from the oil reservoir 58 to the outside through the drain hole 62.

As the oil O is supplied to a plurality of needle bearings by one introduction part, it is necessary to collect and introduce a large amount of the oil O from the internal combustion engine 1 to the introduction part. For this reason, an oil collection rib 65 is formed on the rear end region of the upper surface of the upper housing member 12 so as to increase the amount of collection of the oil O as shown in FIG. 29.

As mentioned above, it is possible to improve the reliability of lubrication of the needle bearing 34, 35, 36, 40, 41 as the oil O can be directly supplied to the needle bearing 34, 35, 36, 40, 41 even in the twelfth embodiment.

It is alternatively feasible in the twelfth embodiment to use slide bearings such as plain bearings in place of the needle bearings 34, 35, 36, 40 and 41.

[Thirteenth Embodiment]

Figure 30:
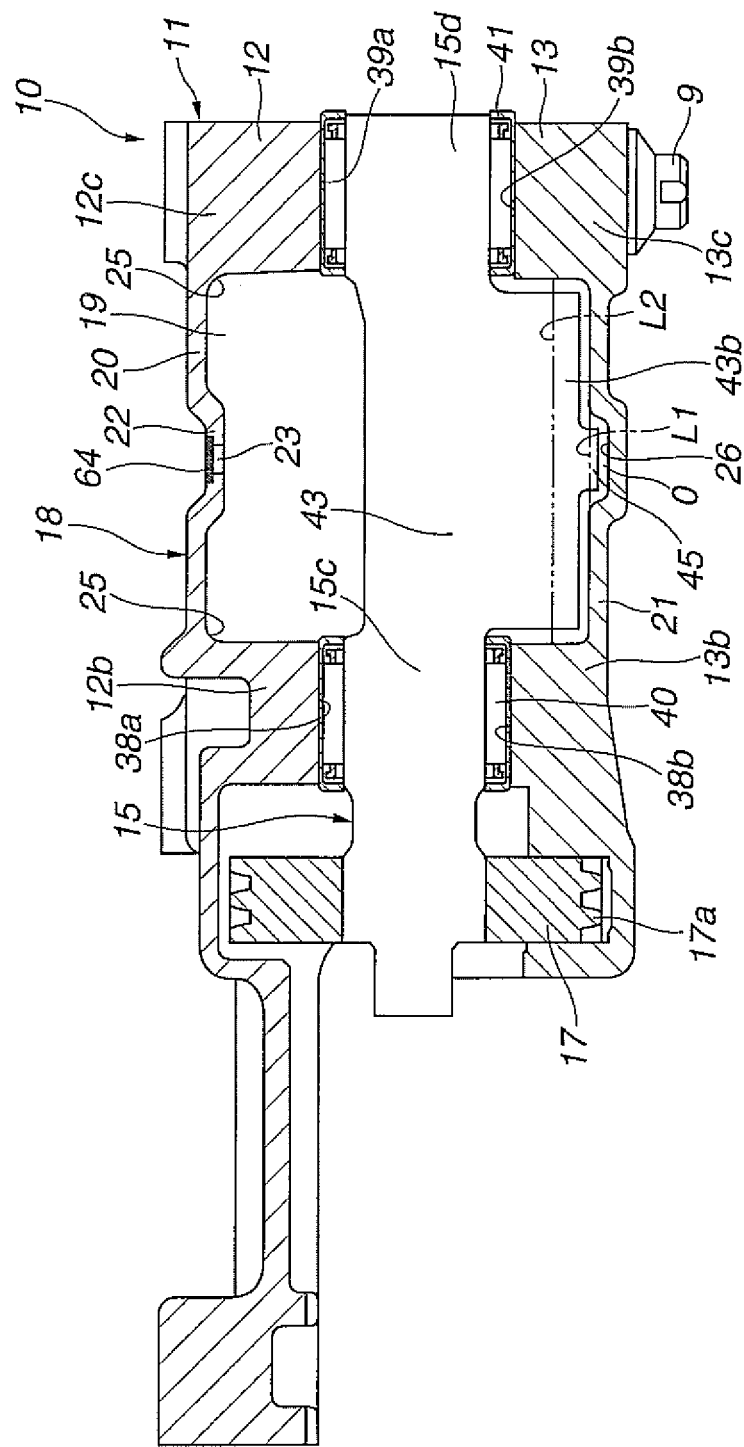
FIG. 30 is a section view corresponding to FIG. 6 but showing a balancer device according to a thirteenth embodiment of the present invention.

The thirteenth embodiment is basically the same as but different from the first embodiment in that: a mesh type oil filter 64 (as filter members) is arranged in the oil introduction hole 23 as shown in FIG. 30. Although not specifically shown in the drawing, the oil filter 64 is provided to each of the drive—and driven-side introduction holes 23. As a foreign substance (such as impurities or contaminants) can be filtered out and removed from the oil O by the oil filters 64 at the time of introduction of the oil O to the weight accommodation room 19, it is possible to prevent the entry of the foreign substance into the needle bearing 34, 35, 36, 40, 41 and improve the durability of the needle bearing 34, 35, 36, 40, 41.

[Fourteenth Embodiment]

Figure 31:
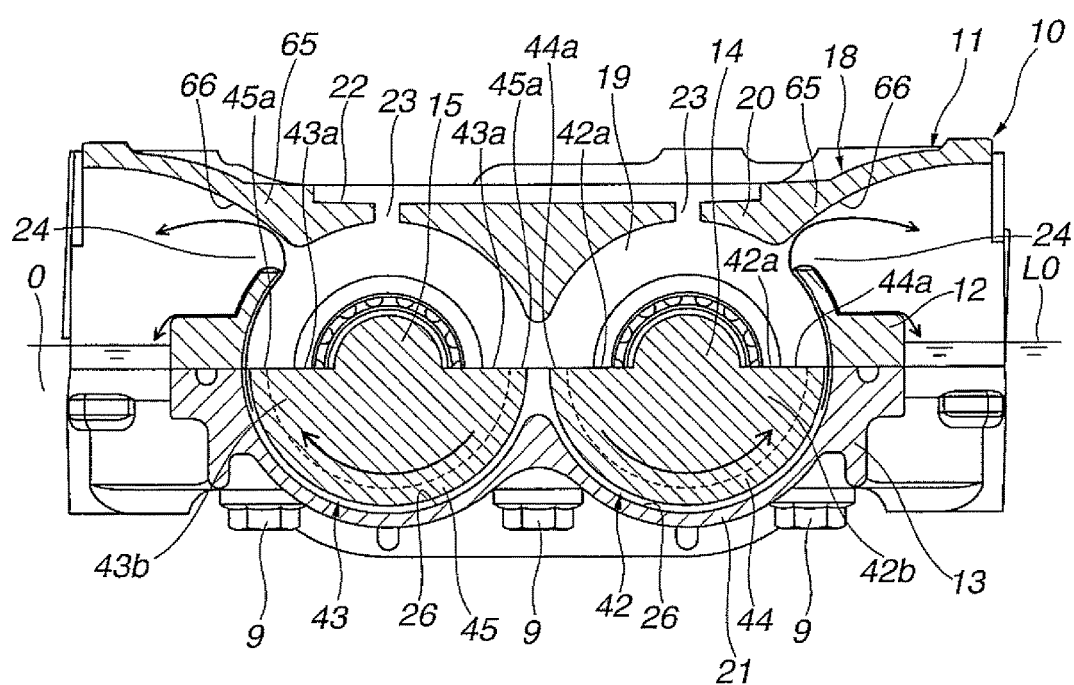
FIG. 31 is a section view corresponding to FIG. 7 but showing a balancer device according to a fourteenth embodiment of the present invention.

The fourteenth embodiment is basically the same as but different from the first embodiment in that: the drive shaft 14 and the driven shaft 15 are rotated in opposite directions to those of the first embodiment as shown by arrows in FIG. 31. Namely, the oil O is agitated in opposite directions by the drive—and driven-side counter weights 42 and 43 and forced upward under the action of rotational force of these counter weights 42 and 43.

In consideration of such oil flow, interference wall portions 65 are formed on respective lateral edges of the upper circumferential wall 20 as shown in FIG. 31. In the fourteenth embodiment, the interference wall portions 65 are arranged so as to extend substantially linearly from the lateral edges of the upper circumferential wall 20 and cover the upper sides of the oil discharge holes 24. Further, the interference wall portions 65 have, on lower sides thereof, guide surfaces 66 formed in a substantially circular arc cross-section shape throughout the front-rear direction and inclined downwardly toward the oil discharge holes 24.

When the oil O is agitated and forced upward by the rotation of the counter weight 42, 43, the guide surface 66 of the interference wall portion 65 interferes with the upward flow of the oil O, change the direction of the flow of the oil O in a folded manner and guides the flow of the oil O toward the oil discharge hole 24 so that the oil O can be efficiently and effectively discharged to the oil pan 5 through the oil discharge hole 24. The discharge part attains substantially the same oil discharge performance even when the drive and driven shafts 14 and 15 are rotated in opposite directions to those of the first embodiment. It is thus possible to properly decrease the amount of the oil O in the weight accommodation room 19 and reduce the friction between the counter weight 42, 43 and the oil O.

The configurations of the thirteenth and fourteenth embodiments can be applied to not only the oil mist lubrication type but also the direct lubrication type.

[Other Embodiments]

In the above embodiments, the balancer device 10 is mounted to the lower part 2*a* of the cylinder block 2 of the internal combustion engine 1 through the ladder frame 4. It is alternatively feasible to mount the balancer device 10 directly to the lower part 2*a* of the cylinder block 2 of the internal combustion engine 1 in the case where no ladder frame 4 is provided.

In the above embodiments, the oil O dropped from the internal combustion engine 1 is introduced to the needle bearing 34, 35, 36, 40, 41 by the introduction part. Alternatively, the oil O from the oil pump 37 may be introduced to the needle bearing 34, 35, 36, 40, 41 by the introduction part upon connection of the oil pump 37 to the introduction part. In this case, it becomes easier to control the amount of introduction of the oil O to the needle bearing 34, 35, 36, 40, 41. It is also possible to supply the oil O from which impurities or contaminants have been filtered out to the needle bearing 34, 35, 36, 40, 41 and improve the durability of the needle bearing 34, 35, 36, 40, 41.

The present invention is based on Japanese Patent Application No. 2014-228519 (filed on Nov. 11, 2014) of which the entire contents are herein incorporated by reference.

Although the present invention has been described with reference to the above exemplary embodiments, it will be understood that the present invention is not limited to these exemplary embodiments. Various changes and modifications of the embodiments described above will occur to those skilled in the art in light of the above teachings. The scope of the present invention is defined with reference to the following claims.

What is claimed is:

1. A balancer device for an internal combustion engine, comprising:
   a housing fixed to the internal combustion engine and defining therein a weight accommodation room;
   at least one roller bearing disposed in the housing;
   a balancer shaft rotatably supported in the housing by the at least one roller bearing;

a balancer weight integrally mounted on the balancer shaft and rotatably accommodated in the weight accommodation room;
an introduction part that introduces a lubricating oil from an outside of the housing to an inside of the weight accommodation room; and
a discharge part that provides communication between the inside and an outside of the weight accommodation room and discharges the lubricating oil from the inside of the weight accommodation room,
wherein the at least one roller bearing is arranged to face the weight accommodation room,
wherein the housing includes a pair of front and rear side walls extending in a width direction of the internal combustion engine and a circumferential wall formed between the side walls such that the weight accommodation room is defined by the side walls and the circumferential wall,
wherein the housing has a collection groove formed in an inner circumferential surface of a lower side of the circumferential wall with respect to a direction of gravity so as to collect the lubricating oil in the collection groove, and
wherein the balancer weight has a protrusion formed thereon in a rotation direction of the balancer weight along the collection groove.

2. The balancer device according to claim 1,
wherein the introduction part provides communication between the inside and the outside of the weight accommodation room.

3. The balancer device according to claim 2,
wherein the introduction part has an introduction hole opened at an upper side of the circumferential wall, and
wherein the discharge part has a discharge hole opened at a lateral side of the circumferential wall along an axial direction of the balancer shaft.

4. The balancer device according to claim 3,
wherein the at least one roller bearing includes roller bearings disposed in the respective side walls of the housing, and
wherein the introduction part has introduction holes formed in regions of the circumferential wall within the vicinity of the respective roller bearings.

5. The balancer device according to claim 4,
wherein the housing has chamfered surfaces formed on boundaries between an inner circumferential surface of the upper side of the circumferential wall and wall surfaces of the side walls, the chamfered surfaces being inclined downwardly toward the side walls, and
wherein lower opening edges of the introduction holes are connected to the chamfered surfaces.

6. The balancer device according to claim 3,
wherein the internal combustion engine has an oil pan that stores therein the lubricating oil to circulate to the internal combustion engine, and
wherein the housing is located inside the oil pan.

7. The balancer device according to claim 6,
wherein the introduction hole is arranged at a higher position than an oil surface of the lubricating oil in the oil pan.

8. The balancer device according to claim 1,
wherein the inner circumferential surface of the lower side of the circumferential wall includes a surface area inclined downwardly toward the collection groove.

9. The balancer device according to claim 8,
wherein the at least one roller bearing includes roller bearings disposed in the respective side walls of the housing,
wherein the collection groove is arranged at a substantially middle position of the weight accommodation room in the axial direction of the balancer shaft.

10. The balancer device according to claim 9,
wherein the introduction hole and the collection groove are arranged at the same position of the weight accommodation room or within the vicinity of each other in the axial direction of the balancer shaft.

11. The balancer device according to claim 1
wherein the collection groove is formed in a region of the circumferential wall within the vicinity of the at least one roller bearing.

12. The balancer device according to claim 11,
wherein the protrusion has an outer circumferential surface inclined downwardly toward the at least one roller bearing.

13. The balancer device according to claim 1,
wherein the protrusion has a concave groove formed in an outer circumferential surface thereof.

14. The balancer device according to claim 1, further comprising:
a filter member disposed in the introduction part so as to remove a foreign substance from the lubricating oil.

15. A balancer device for an internal combustion engine, comprising:
a housing fixed to the internal combustion engine and defining therein a weight accommodation room;
a roller bearing disposed in the housing;
a balancer shaft rotatably supported in the housing by the roller bearing;
a balancer weight integrally mounted on the balancer shaft and rotatably accommodated in the weight accommodation room;
an introduction part having a main oil passage formed in the balancer shaft and extending along a longitudinal axis of the balancer shaft, and a branch oil passage formed in the balancer shaft and branched off from the main oil passage with respect to the longitudinal axis of the balancer shaft, such that the introduction part allows free flow of a lubricating oil from an outside of the housing and introduces the lubricating oil to the roller bearing via the main oil passage and the branch oil passage; and
a discharge part that provides communication between an inside and an outside of the weight accommodation room and discharges the lubricating oil from the inside of the weight accommodation room.

16. The balancer device according to claim 15,
wherein the introduction part has a reservoir being in communication with an axial end portion of the roller bearing so as to store therein the lubricating oil for introduction to the roller bearing.

17. The balancer device according to claim 16,
wherein the introduction part has an introduction hole opened at an upper side of the housing and being in communication with the reservoir; and
wherein a clearance on a side of the reservoir opposite from the roller bearing is arranged such that part of the lubricating oil stored in the reservoir is discharged out through the clearance.

18. A balancer device for an internal combustion engine, comprising:
- a housing fixed to the internal combustion engine and defining therein a weight accommodation room;
- needle bearings disposed in the housing;
- drive- and driven-side balancer shafts rotatably supported in the housing by the needle bearings such that the drive-side balancer shaft is rotated by rotation of a crankshaft of the internal combustion engine and such that the driven-side balancer shaft is rotated by rotation of the drive-side balancer shaft;
- balancer weights integrally mounted on the drive- and driven-side balancer shafts and rotatably accommodated in the weight accommodation room with one or both end sides of the balancer weights being supported by the needle bearings;
- an introduction part that introduces a lubricating oil to the weight accommodation room from an outside of the housing; and
- a discharge part that provides communication between an inside and an outside of the weight accommodation room and discharges the lubricating oil from the inside of the weight accommodation room, wherein the needle bearings are arranged to face the weight accommodation room wherein the housing includes a pair of front and rear side walls extending in a width direction of the internal combustion engine and a circumferential wall formed between the side walls such that the weight accommodation room is defined by the side walls and the circumferential wall, wherein the housing has a collection groove formed in an inner circumferential surface of a lower side of the circumferential wall with respect to a direction of gravity so as to collect the lubricating oil in the collection groove, and wherein the balancer weight has a protrusion formed thereon in a rotation direction of the balancer weight along the collection groove.

* * * * *